United States Patent [19]
Repphun et al.

[11] Patent Number: 5,559,650
[45] Date of Patent: Sep. 24, 1996

[54] LUBRICATED DISK DRIVE

[76] Inventors: William Repphun, 2652 Crestridge Ct.; Walter Wong, 8654 Thunderhead Dr.; Robert E. Yates, 8324 Larkspur Rd., all of Boulder, Colo. 80302; Gregg Johnson, 2645 Valewood Ave., Carlsbad, Calif. 92008; Terence West, 12921 Caminito Del Barco, Del Mar, Calif. 92014

[21] Appl. No.: 410,555

[22] Filed: Mar. 23, 1995

Related U.S. Application Data

[63] Continuation of Ser. No. 976,198, Nov. 13, 1992, abandoned.

[51] Int. Cl.$^6$ .................................................. G11B 33/14
[52] U.S. Cl. ............................................... 360/97.02
[58] Field of Search ........................... 360/97.02, 97.01, 360/103, 104

[56] References Cited

U.S. PATENT DOCUMENTS

| | | |
|---|---|---|
| 872,039 | 11/1907 | Adams . |
| 1,630,713 | 5/1927 | Meyer . |
| 1,990,548 | 2/1935 | Keller et al. . |
| 2,062,250 | 11/1936 | Moller . |
| 2,426,838 | 9/1947 | Miller . |
| 2,502,318 | 3/1950 | Fischer . |
| 2,603,697 | 7/1952 | Korte . |
| 2,612,566 | 10/1952 | Anderson et al. . |
| 2,614,169 | 10/1952 | Cohen et al. . |
| 2,629,605 | 2/1953 | Krisch . |
| 2,656,420 | 10/1953 | Isberg . |
| 2,692,803 | 10/1954 | Gerard . |
| 2,722,463 | 11/1955 | Shaw et al. . |
| 2,736,106 | 2/1956 | Offen . |
| 2,743,933 | 5/1956 | Baines . |
| 2,772,135 | 11/1956 | Hollabaugh et al. . |
| 2,862,781 | 12/1958 | Baumeister . |
| 2,928,709 | 3/1960 | Baumeister . |

(List continued on next page.)

FOREIGN PATENT DOCUMENTS

| | | |
|---|---|---|
| 0127444 | 5/1984 | European Pat. Off. . |
| 0302606 | 8/1989 | European Pat. Off. . |
| 0367510 | 5/1990 | European Pat. Off. . |
| 0384762 | 8/1990 | European Pat. Off. . |
| 129354 | 4/1967 | Germany . |
| 63-52328 | 3/1988 | Japan ..................................... 360/131 |
| US84/01224 | 8/1984 | WIPO . |
| US88/00604 | 2/1988 | WIPO . |

OTHER PUBLICATIONS

"Adaptation of Talk," Vittorio Castelli at ANSI X3B-7 Rigid Disk Committee in 1987.
"Dynamics of Air–Lubricated Slider Bearings for Noncontact Magnetic Recording," T. Tang, Transactions of the ASME, Apr. 1971.

(List continued on next page.)

*Primary Examiner*—Stuart S. Levy
*Assistant Examiner*—Allen Cao
*Attorney, Agent, or Firm*—Fliesler, Dubb, Meyer & Lovejoy

[57] ABSTRACT

A storage device including a housing defining a controlled environment. A storage medium is mounted in the housing, with a liquid lubricant contained in the housing and disposed on the surface of the storage medium. A spindle motor is provided in the housing for rotating the storage medium. At least one read/write head is mounted on an actuator assembly, the assembly for positioning the read/write head with respect to the storage medium. Control electronics are coupled to the actuator, read write head, and spindle motor, for interacting with the actuator, head, and motor to read data from and write data to the storage medium. The device housing has a length of about four inches, a height of about five-tenths inch, and a width of about two and three-quarters inches. A wick is provided to recirculate and dispose the liquid bearing on the surface of the storage medium. The wick generally has a disposing portion, positioned adjacent each side of the storage medium, and a collection portion disposed within the housing. The collection portion collects fluids at all attitudes in which the storage device housing may be oriented.

17 Claims, 18 Drawing Sheets

U.S. PATENT DOCUMENTS

| | | |
|---|---|---|
| 2,969,435 | 1/1961 | Lynott . |
| 3,005,675 | 10/1961 | Ledin et al. . |
| 3,032,884 | 5/1962 | Collins et al. . |
| 3,065,460 | 11/1962 | Atenau et al. . |
| 3,072,752 | 1/1963 | Charnetsky, Jr. et al. . |
| 3,119,989 | 1/1964 | Wasylenko . |
| 3,148,248 | 9/1964 | Johnson . |
| 3,170,149 | 2/1965 | Koskie et al. . |
| 3,177,493 | 4/1965 | Durlofsky . |
| 3,181,166 | 4/1965 | Levene . |
| 3,217,302 | 11/1965 | Hagen . |
| 3,375,506 | 3/1968 | Bruehl . |
| 3,453,611 | 7/1969 | Laermer . |
| 3,516,081 | 6/1970 | Horsfall et al. . |
| 3,579,212 | 6/1971 | Gabor . |
| 3,678,211 | 7/1972 | Hoogendorn et al. . |
| 3,839,734 | 10/1974 | George et al. . |
| 3,855,625 | 12/1974 | Garnier et al. . |
| 3,939,495 | 2/1976 | Nagai et al. . |
| 4,218,715 | 8/1980 | Garnier . |
| 4,366,519 | 12/1982 | Maruyama et al. . |
| 4,484,201 | 11/1984 | Fujisawa . |
| 4,626,941 | 12/1986 | Sawada et al. . |
| 4,633,351 | 12/1986 | Bardos et al. . |
| 4,701,820 | 10/1987 | McClure . |
| 4,701,823 | 10/1987 | Sakurl . |
| 4,757,402 | 7/1988 | Mo . |
| 4,789,913 | 12/1988 | Gregory et al. . |
| 4,795,275 | 1/1989 | Titcomb et al. . |
| 4,960,609 | 10/1990 | Homola et al. . |
| 5,025,335 | 6/1991 | Stefansky ........................... 360/97.01 |
| 5,025,336 | 6/1991 | Morehouse et al. ................ 360/97.02 |
| 5,097,368 | 3/1992 | Lemke et al. ....................... 360/97.02 |
| 5,200,867 | 4/1993 | Albrecht et al. ....................... 360/103 |
| 5,202,803 | 4/1993 | Albrecht et al. .................... 360/97.02 |

OTHER PUBLICATIONS

"Dynamic Characteristics of Air–Lubricated Slider Bearing for Noncontact Magnetic Recording," K. Ono, An ASME Publication.

"Dynamic Characteristics of Air–Lubricated Slider Bearing for Noncontact Magnetic Recording," K. Ono, Transactions of the ASME, Apr. 1975.

"A Uniform Flying Height Rotary Actuated Air Bearing Slider," James W. White, IEEE Transactions on Magnetics, vol. MAG–22, No. 5, Sep. 1986.

"Motion Pictures of In–Situ Air Bearing Dynamics," S. E. Millman, et al., IEEE Transactions on Magnetics, vol. MAG–22, No. 5, Sep. 1986.

"An Air Bearing Slider with Uniform Flying Height and Fast Take–Off Characteristics," James W. White, ASLE SP–21, 1986.

"Self–Loading Slider," R. V. Watrous, IBM Technical Disclosure, Bulletin, vol. 22, No. L, Jun. 1979.

"Submicron Spacing of Air–Lubricated Slider on a Disk File with Swinging Arm Actuator," IEEE Transactions on Magnetics, vol. MAG–17, No. 6, Nov. 1981.

"High Density Magnetic Recording Heads for Disk," S. Suzuki, et al., IEEE Transactions on Magnetics, vol. MAG–17, No. 6, Nov. 1981.

"Atmospheric Corrosion of Magnetic–Film Structures," S. K. Doss and G. A. Condas, Metallurgical Transactions, vol. 18A, Jan. 1987.

"Non–Repeatable Flutter of Magnetic Recording Disks," Gilles Bouchard, et al., IEEE Transactions on Magnetics, vol. MAG–22, No. 5, Sep. 1986.

"Theoretical and Experimental Investigation of the Dynamic Flying Characteristics of 3370–Type Sliders in 5–1/4 Inch Disk Drives," Denny K. Miu and David B. Bogy, IEEE Transactions of Magnetics, vol. MAG–22, No. 5, Sep. 1986.

"On Non–Linear Response of Head–Disk Interface to Wavy Excitation," V. Ponnaganti, et al., IEEE Transactions on Magnetics, vol. MAG–22, No. 5, Sep. 1986.

"Spacing Fluctuation of Flying Head Sliders in Track Accessing (Forced Vibration Analysis Using Finite Element Method)," K. Aruga, et al., ASLE SP–21, 1986.

"Noise in High Performance Thin–Film Longitudinal Magnetic Recording Media (Invited)," Nathan R. Belk, et al., IEEE Transactions on Magnetics, vol. MAG–21, No. 5, Sep. 1985.

"Dynamic Characteristics of a Magnetic Head Slider," Y. Mizoshita, et al., IEEE Transactions on Magnetics, vol. MAG–21, No. 5, Sep. 1985.

"New Method of Detecting Contact Between Floating–Head and Disk," T. Kita, et al., IEEE Transactions on Magnetics, vol. MAG–16, No. 5, Sep. 1980.

"The Relationship Between Disk Surface Acceleration and Head–To–Disk Interaction," D. B. Richards, et al., IEEE Transactions on Magnetics, vol. MAG–14, No. 4., Jul. 1978.

"Advanced Technology for High Recording Density Disk Storage," Reizo Kaneko, IEEE Transactions, 1984.

"Novel Piezoelectric Transducers to Monitor Head–Disk Interactions," C. E. Yeach–Scranton, IEEE Transactions, 1986.

"Precise Optical Measurement of Slider Dynamics," G. L. Best, et al., IEEE Transactions on Magnetics, vol. MAG–22, No. 5, Sep., 1986.

"Laser Doppler Interferometry on Magnetic Recording Systems (Invited)," D. B. Bogy, et al., IEEE Transactions on Magnetics, vol. MAG–21, No. 5, Sep., 1985.

"The Establishment of Standard Reference Surfaces for Rigid Magnetic Disks with High Recording Density," Jurgen Hartman, Oct., 1982.

"Lubricant–Stabilizing Structure for Magnetic Disks," IBM Technical Disclosure Bulletin, vol. 28, No. 2, Jul., 1985.

"Prairie 220 Form Factor," InfoCorp Storage News Report, Storage Commentary, Sep. 30, 1988.

"Here Comes the First 2.5–in. Winchester Drive," Jonah McLeod, Probing the News, Oct., 1988, Electronics.

"A New 2–1/2 Inch Thin Film Disk," Pearce, Rice & Tang, Solid State Technology, Oct., 1988, Tech Notes.

"Peripherals," Gary Stix, Associate Editor, p. 40.

"Magnetic Recording," vol. II, D. C. Mee, et al., editors, copyright 1988 pp. 48–55.

"Characterization of Lubricant/Solid Interfaces by FTIR," R. S. Timsit, G. Strattford, & M. Fairlie, Alcan International Limited, pp. 98–104 of Tribology and Mechanics of Magnetic Storage Systems, Society of Tribologists and Lubrication Engineers, 1987 conference proceedings.

"Lubricants for Magnetic Recording Media," IBM Technical Disclosure Bulletin, Dec. 1986, Friedman & Marchese.

"3–1/2 Inch High–Performance Winchester Disk Drives for Laptop Computers," Conner Peripherals article Peripherals, Gary Stix.

"Communication" from European Patent Office forwarding European Patent Search Report.

"Method of Prolonging the Life of Magnetic Disk Storages," IBM Technical Disclosure Bulletin, vol. 31, No. 1, Jun. 1988.

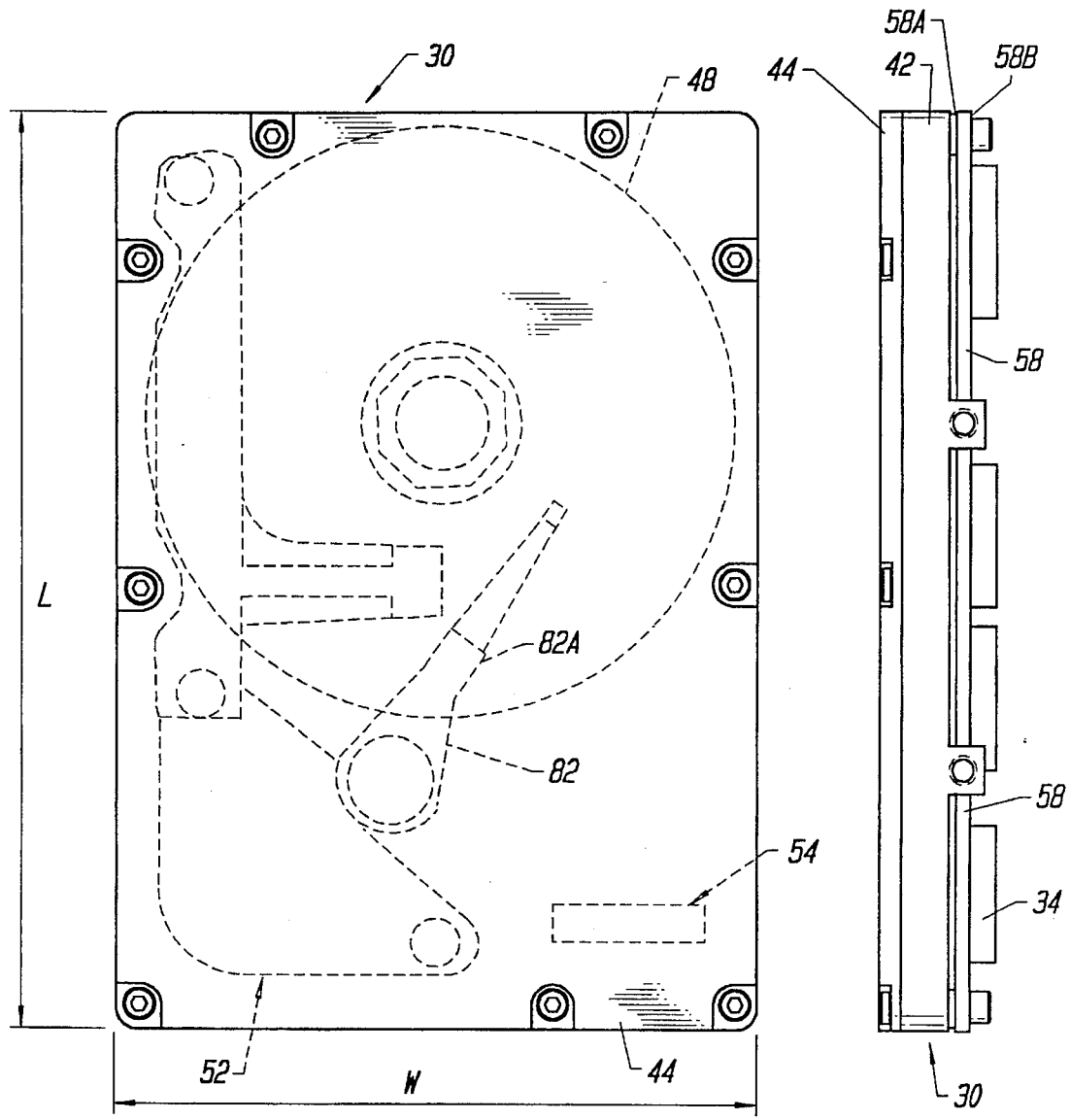
FIG. 3A
FIG. 3B
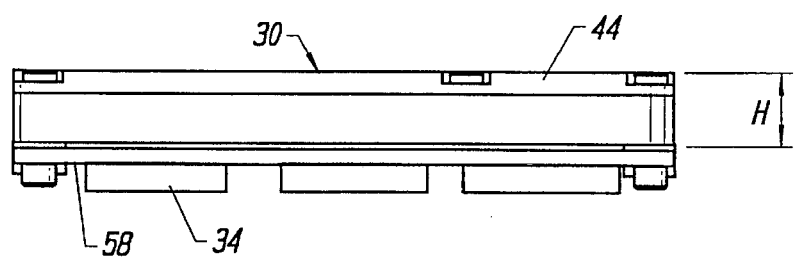
FIG. 3C

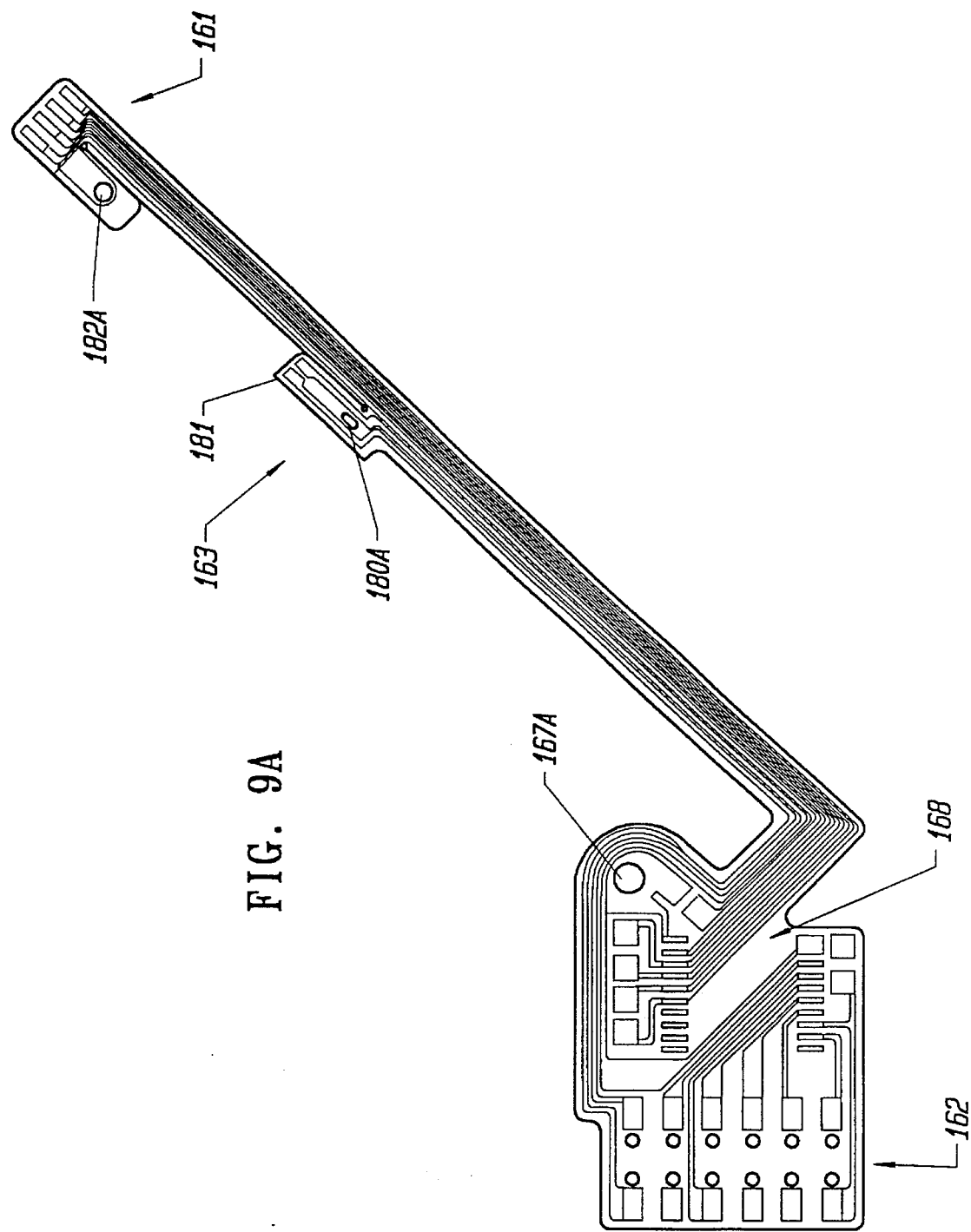

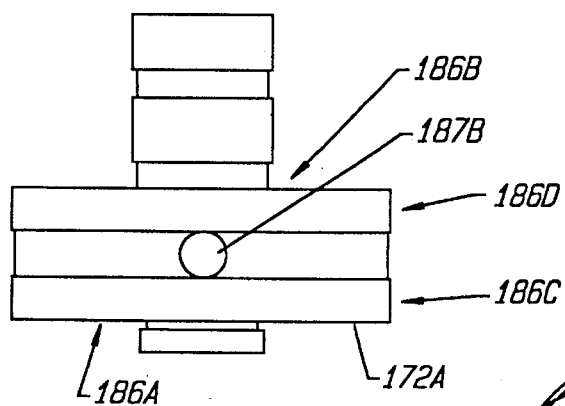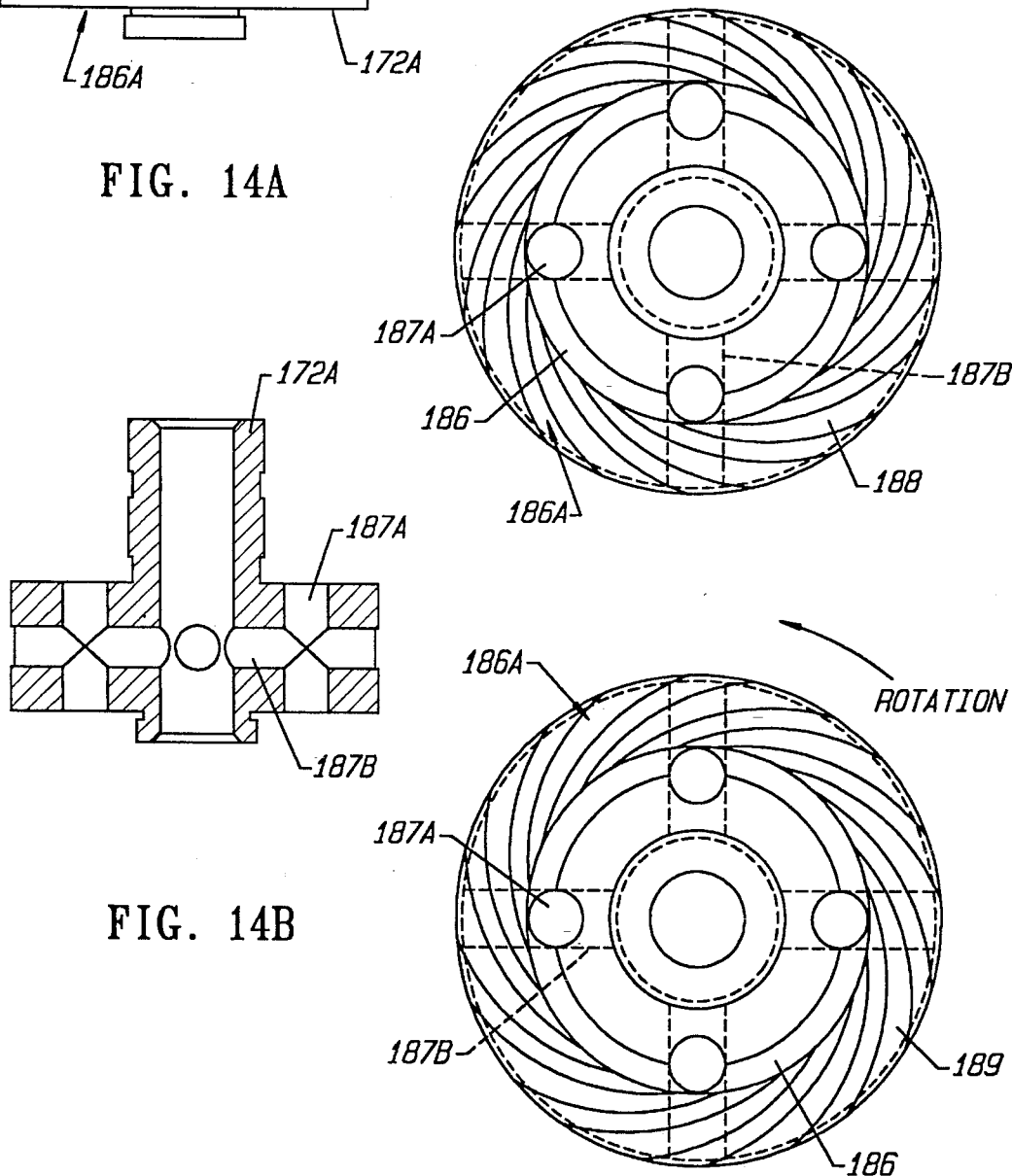
FIG. 14A
FIG. 14B
FIG. 14C
FIG. 14D

LUBRICATED DISK DRIVE

This application is a continuation of Ser. No. 07/976,198, filed Nov. 13, 1992, now abandoned.

CROSS-REFERENCE TO RELATED APPLICATION(S)

LOW DRAG LIQUID BEARING RECORDING HEAD, U.S. patent application Ser. No. 07/976,422, now U.S. Pat. No. 5,316,460, issued May 31, 1994, inventors William French, James U. Lemke, Turguy Goker, Walter Wong, William Repphun, David Danson, filed Nov. 13, 1992.

LIQUID RECIRCULATION IN AN INFORMATION STORAGE DEVICE, U.S. patent application Ser. No. 07/976,216, filed Nov. 13, 1993, inventor Walter Wong.

ARCHITECTURE FOR SEALED DISK DRIVE, Ser. No. 664,659, filed Mar. 5, 1991, which is a divisional of U.S. Pat. No. 5,029,026, which is a divisional of Ser. No. 056,584, filed May 29, 1987 now abandoned.

DISK DRIVE SYSTEM CONTROLLER ARCHITECTURE, U.S. Pat. No. 4,979,056.

DISK DRIVE SOFTWARE SYSTEM ARCHITECTURE, Ser. No. 0/7790,008, filed Nov. 4, 1991, which is a file wrapper continuation of Ser. No. 488,386, filed Feb. 23, 1990, which is a continuation of Ser. No. 057,806, filed Jun. 2, 1987, now abandoned.

DISK DRIVE SYSTEM CONTROL ARCHITECTURE UTILIZING EMBEDDED REAL-TIME DIAGNOSTIC MONITOR, U.S. Pat. No. 4,979,055.

LOW-POWER HARD DISK DRIVE ARCHITECTURE, Ser. No. 564,693, filed Aug. 7, 1990, which is a continuation of Ser. No. 152,069, filed Feb. 4, 1988, now abandoned.

DISK DRIVE SYSTEM EMPLOYING ADAPTIVE READ/WRITE CHANNEL CONTROLS AND METHOD OF USING SAME, Ser. No. 07/784,655, filed Oct. 28, 1991, which is a file wrapper continuation of Ser. No. 420,371, filed Oct. 12, 1989.

DISK DRIVE SYSTEM USING MULTIPLE EMBEDDED QUADRATURE SERVO FIELDS, Ser. No. 07/860,299, filed Mar. 27, 1992, which is a file wrapper continuation of Ser. No. 386,504, filed Jul. 27, 1989.

ARCHITECTURE FOR 2½ INCH DIAMETER SINGLE DISK DRIVE, U.S. Pat. No. 5,025,335.

MAGNETIC PARKING DEVICE FOR DISK DRIVE, U.S. patent application Ser. No. 07/909,149, filed Aug. 18, 1992, which is a continuation of application Ser. No. 07/643,703, now U.S. Pat. No. 5,170,300 filed Jan. 22, 1991, which is a file wrapper continuation of U.S. patent application Ser. No. 07/269,873, filed Nov. 10, 1988.

INFORMATION RECORDING APPARATUS WITH A NON-NEWTONIAN LIQUID BEARING, application Ser. No. 07/810,955, inventors Lemke, et al., filed Dec. 19, 1991, which is a continuation of application Ser. No. 07/453,312, filed Dec. 20, 1989, issued as U.S. Pat. No. 5,097,368, on Mar. 17, 1992.

INFORMATION RECORDING APPARATUS WITH A LIQUID BEARING, Lemke, et al., Ser. No. 07/590,608, Oct. 17, 1988.

WET RIGID DISK DRIVE ASSEMBLY WITH A CONICAL SPINDLE BEARING, Lemke, et al., Ser. No. 587,620, filed Feb. 24, 1989.

Each of these Related Applications and Patents are assigned to the Assignee of this subject Patent and are hereby incorporated by reference.

BACKGROUND OF THE INVENTION

1. Field of the Invention

The invention relates to data storage technology, and in particular, to a data storage device utilizing storage media with a liquid lubricant interface between the storage media and the data recording head.

2. Description of the Related Art

The data storage industry has followed a continuing trend of decreasing the physical size of storage components, while maintaining or increasing the quantity of data stored by the component. In the field of data storage on magnetic disks, or "disk drives," reductions in physical size have followed a trend of reducing the physical space occupied by the storage device, or "form factor", by approximately one-half. Thus, the length of a succeeding series of drives has equaled the width of the previous series of drives, and the width of the succeeding drive equalled approximately one-half the length of the preceding drive series. The physical height of the drives has followed a less orderly progression, beginning first with the "full height" drives, approximately 3.3" high, sized to fit into a drive bay of an IBM personal computer, then the 1.62" "half-height" drives, followed by even shorter 1" and ¾" height drives.

Disclosed in co-pending application Ser. No. 07/508,960, is a disk drive having a two and one-half inch (2½") form factor in which the length of the drive is approximately the width of a three and one-half inch (3½") drive and the width is approximately one-half of the length of a 3½" drive. The dimensions of the disk drive are: length 4 inches, width 2¾ inches, and height approximately 0.68 inch. One embodiment of the disk drive weights less than approximately six (6) ounces, and the single disk in the drive has a diameter of approximately 2.56 inches.

The overall power consumption of the disk drive is less than 3.5 watts and the power consumption may be as low as 1.5 watts during idle periods. Thus, the disk drive is ideal for use in portable or other battery powered computers. The power consumption of the disk drive is further reduced by the use of a sleep mode to less than 0.5 watt. A closed loop, embedded servo control system provides the single two and one-half inch diameter disk with a storage capacity of 20 Mb.

The drive disclosed in the '960 application incorporates an air bearing read/write head positioned over the surface of the magnetic recording disk to read data from and record data on the disk surface. Although continual contact between the transducer (typically a read/write head mounted on a slider) and the magnetic storage medium is advantageous from a magnetic perspective, such arrangement is undesirable because wear and material interactions lead to degraded system reliability and performance. Accordingly, one paramount consideration in designing magnetic recording systems is the maintenance of spacing between the head and medium.

Conventionally, air bearing sliders have been limited to a flying height on the order of 2–3 μinches. U.S. Pat. No. 5,097,368, owned by the assignee of the instant application, discloses an information recording apparatus with a non-newtonian liquid bearing between the head and the disk which allows the head to achieve a lower interface distance between the head and the disk than generally possible with air bearing slider configurations. A major problem in the practical implementation of disk drives incorporating a liquid lubricant at the head-disk interface is the maintenance of the liquid bearing on the surface of the disk in no matter what orientation the drive may encounter during operation; that is, the liquid lubricant must be maintained on the disk in whatever attitude the drive takes with respect to the force of gravity. Obviously, the force of gravity will induce the liquid to move to the lowest point in the drive at any given time. This problem may be viewed in two contexts: where the lubricant must be applied to the surface of the disk at a location and in a manner where the surface tension of the liquid bearing is sufficient to maintain a sufficient quantity of the liquid bearing at the head disk interface; and where constant circulation of the liquid bearing to the disk surface is assured, whatever orientation the disk drive takes with respect to gravity.

In European Patent No. 0367,510, a wick structure is shown for use in applying the liquid lubricant from a reservoir at a low point in the head disk enclosure to the surface at the inner diameter of the disk surface by capillary action. Various methods are also shown therein for recirculating the liquid bearing fluid to the wick structure. However, no mention is made of the problems associated with providing the liquid onto the disk surface at the various attitudes which a disk drive may encounter.

The orientation problem is particularly acute in notebook and laptop computers wherein the possible operating attitudes which the drive may encounter are likely to be numerous and varied.

A further problem with using a liquid bearing in a hard disk drive involves preventing leakage of the liquid bearing from the drive. The non-Newtonian fluids which are most advantageously used as liquid bearings in such drives have low viscosity, and conventional sealing techniques used for disk drives are only partially effective in preventing leakage of the liquid bearing from the drive. Leakage must be prevented since only a finite amount of lubricant will be included in the drive prior to provision to end users. In addition, leakage would result in problems of contamination or damage to the host system.

An additional problem in using a liquid bearing in drives concerns the compatibility of such non-Newtonian fluids with conventional materials utilized in manufacturing parts for the drives. In particular, ball-bearing grease conventionally used as actuator and spin motor ball-bearing lubricants, adhesives used to secure bearings and other drive components, and plastics used in headers and flex circuits, all used in air bearing disk drives, are susceptible to the solvent characteristics of the non-Newtonian fluids. As a result, such materials can decompose and cause contamination within the controlled, internal drive environment.

In addition, the properties of such non-Newtonian fluids are susceptible to temperature changes. In particular, the vapor pressure and viscosity of the liquids change to varying degree with increases or decreases in temperature. Thus, such effects must be accounted for in providing a lubricated disk drive suitable for use in a laptop or notebook computer.

Finally, drag is a significant problem in a lubricated disk drive. In particular, movement of the read/write head over a fluid, even a non-Newtonian fluid, causes drag on the head and, where used, an applicator wick. Such drag is not present in an air bearing disk drive since air has very low viscosity. This drag must be accounted for in both terms of reducing the total drag on the head through a head design which provides the least amount of drag possible, and in terms of ensuring that the actuator and spindle motor can accommodate any drag which cannot be reduced through the head design. In addition, the liquid bearing applicator must be designed to achieve low drag.

The present invention is directed to a two and one-half inch diameter disk drive with enhanced storage capacity provided by allowing the head disk interface distance to be reduced to a flying height of two μinches or less.

SUMMARY OF THE INVENTION

Thus, it is an object of the invention to provide a high capacity data storage device for use in laptop, portable, and notebook computers, and the like.

A further object of the invention is to provide a disk drive storage device utilizing Winchester storage technology having increased capacity.

Yet another object of the invention is to provide the above objects in a disk drive having a liquid bearing lubricant at the head/disk interface, thus providing a so-called liquid disk drive.

A further object of the invention is to provide a liquid disk drive which is suitable for use under all conditions in which a standard air-bearing disk drive would be used, specifically a liquid drive which may be utilized at all attitudes with respect to the force of gravity.

These and other objects of the invention are provided in a storage device including a housing defining a controlled environment. A storage medium is mounted in the housing, with a liquid lubricant contained in the housing and disposed on the surface of the disk and within the housing. A spindle motor is provided in the housing for rotating the disk. At least one read/write head is mounted on an actuator assembly, the assembly for positioning the read/write head with respect to the disk. Control electronics are coupled to the actuator, read write head, and spindle motor, for interacting with the actuator, head, and motor to read data from and write data to the disk drive. The device housing has a length of about four (4) inches, a height of about five-tenths (0.5) inch, and a width of about two and three-quarters (2¾) inches.

In a further aspect of the invention, a wick is provided to recirculate and dispose the liquid bearing on the surface of the disk. The wick generally has a disposing portion, positioned adjacent each side of the disk, and a collection portion disposed within the housing. The collection portion collects fluids at all attitudes in which the drive housing may be oriented.

In yet another aspect, a wick structure for a disk drive having a liquid lubricant disposed at the surface of the disk and within a controlled environment defined by a housing is provided. The wick structure includes a transport wick, comprised of a semi-rigid porous material; and an applicator wick, positioned adjacent the disk and coupled to the transport wick, the applicator wick having a first portion in contact with the disk at a first disk radius and a second portion in contact with the disk at a second radius.

In yet another aspect, an actuator for a disk drive is provided wherein the disk drive includes a housing supporting a disk storage medium. The actuator comprises an actuator arm positioned for rotation about an actuator pivot point; and a pivot assembly having a first portion coupled to the housing and a second portion coupled to the actuator arm, the pivot assembly comprising a cross-hair spring.

In a still further aspect, a novel spin motor for use in a disk drive having a liquid bearing is provided. The spin motor includes a bearing housing, supported by the base; a shaft having a first portion mounted in the bearing housing, and a second portion; a journal bearing within the bearing housing between at least a first portion of the bearing housing and the first portion of the shaft; a porous wicking material, provided within the shaft; a hub, mounted on the second portion of the shaft; a stator assembly, mounted coincident with the bearing housing; and a multi-pole ring magnet, mounted on the hub co-incident with the stator assembly.

BRIEF DESCRIPTION OF THE DRAWINGS

The invention will be described with respect to the particular embodiments thereof. Other objects, features, and advantages of the invention will become apparent with reference to the specification and drawings in which:

FIGS. 3A through 3C are plan, side, and end views, respectively, of the disk drive of the present invention.

FIG. 9A is a plan view of the flex circuit utilized in the disk drive of the present invention.

FIGS. 14A–14B are a side view and cross-sectional view of the shaft used in the third embodiment of a spin motor in accordance with the present invention.

FIGS. 14C–14D are top and bottom views, respectively, of the shaft of the third motor embodiment.

DESCRIPTION OF THE PREFERRED EMBODIMENT

Figure 1:
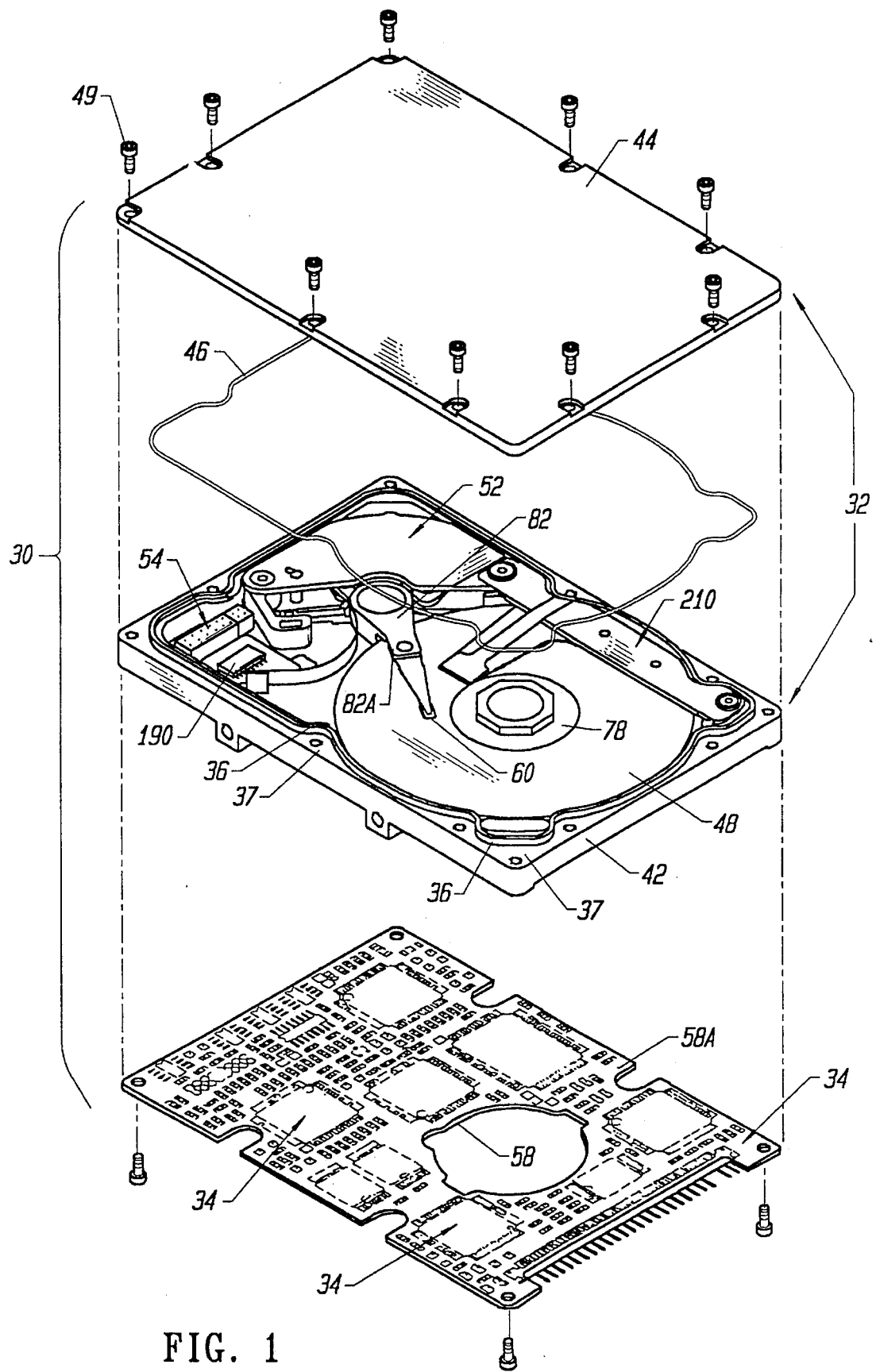
FIG. 1 is a perspective view of the disk drive of the present invention including the hard disk assembly (HDA) and control electronics.

A disk drive according to the present invention will be described with reference to FIGS. 1–14. The disk drive described herein includes, for example, a single hard disk with a magnetic coating and utilizes Winchester technology; however, the disk drive may utilize various numbers of disks (and a corresponding number of heads, usually one per disk surface, i.e., two (2) heads per disk).

Form Factors (Footprint and Height)

The form factor selected for the disk drive of the present invention is a two and one-half inch form factor. Advances in data storage technology and the reduced size of computers have led to disk drives having smaller physical dimensions. The current so-called two and one-half inch (2½") form factor drive has a length which is approximately the width of a 3½" drive and a width of approximately one-half the length of a 3½" drive.

In accordance with the objects of the invention, a liquid bearing is utilized at the head disk interface to provide a reduced flying height for the read/write head, resulting in an increase in data storage capacity. The incorporation of a liquid bearing lubricant in a disk drive of a practical size for use in a laptop or notebook computer, would not be possible without redesigning certain components of the reduced size drive, and the incorporation of novel components into the drive.

Disk drive 30 is ideal for use in lap-top, notebook, palmtop, or other portable or battery-powered computers due to the small form factor and minimal power consumption.

Overall Drive Architecture

As shown in FIGS. 1–4, a disk drive 30 in accordance with the present invention includes two main components, a head-disk-assembly (HDA) 32 and control electronics 34. Control electronics 34 provide control signals to the HDA 32, receive data signals from and transmit data signals to the HDA 32, and interface the disk drive 30 with a host system (not shown) such as a computer, a printer, or a facsimile machine. Although the host system may vary, disk drive 30 is designed for the rigorous operational environment of a laptop, notebook or other portable type computer.

HDA 32 includes a base 42 and a cover 44. A gasket 46 is provided between base 42 and cover 44 to establish a sealed (or controlled) environment between base 42 and cover 44. The seal provided by gasket 46 and the interference fit between base 42 and cover 44 (see FIG. 5) isolates the controlled environment from ambient atmospheric conditions and pressures. The controlled environment is stable at pressures experienced at altitudes from 200 feet below sea level to 10,000 feet above sea level during operation of the disk drive.

The components located in the controlled environment established by HDA 32 include a disk 48 for storing data, a spin motor 50 for rotating the disk 48, an actuator assembly 52 for positioning read/write heads to read data from and write data to disk 48, and a header assembly 54 for transferring electronic signals to and from spin motor 50 and actuator assembly 52.

Figure 2:
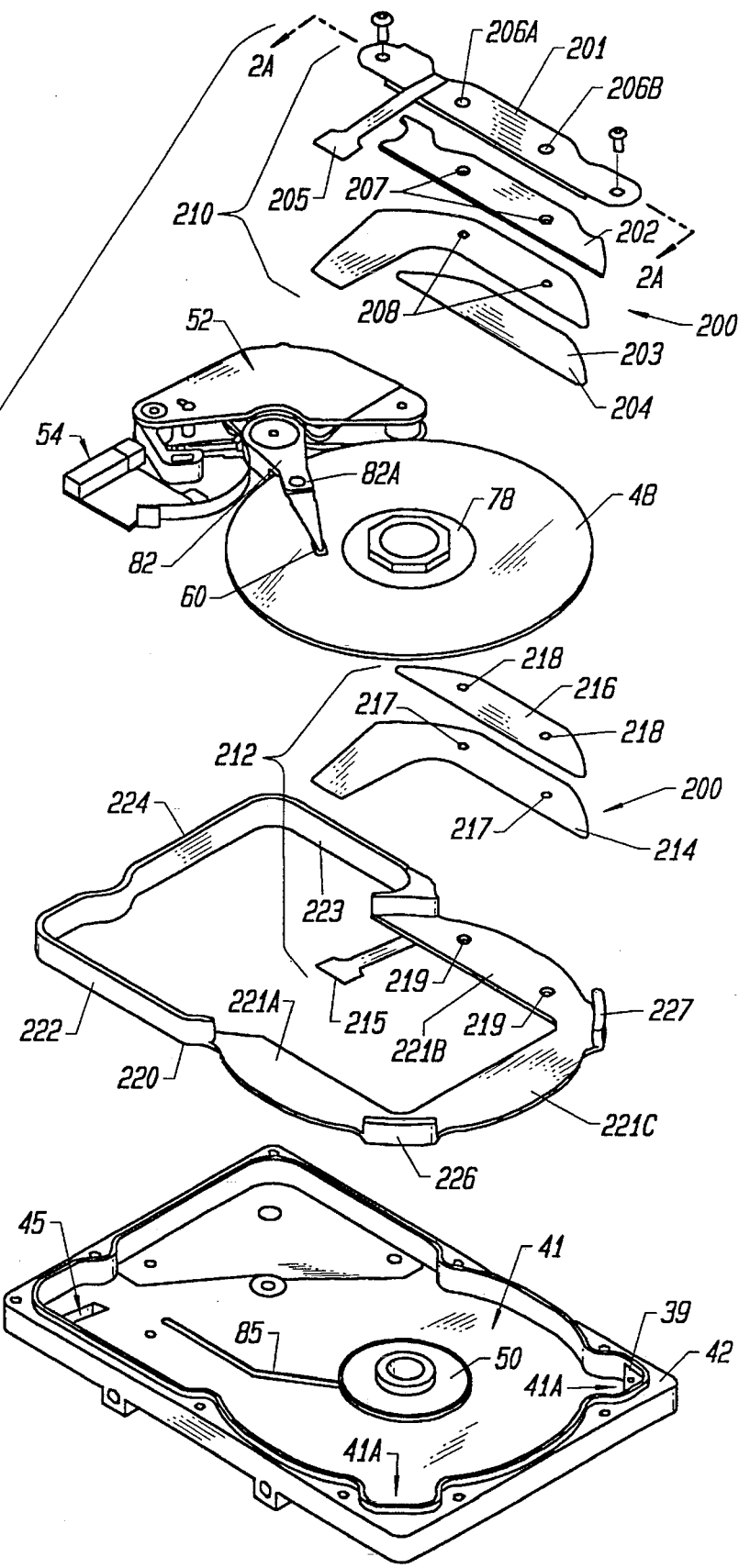
FIG. 2 is a perspective, exploded view of the HDA and wicking assembly of the disk drive of the present invention.

Control electronics 34 are mounted on a printed circuit board (PCB) 58 which includes a plug-in connector 38 designed to be compatible with connectors generally used in personal computers. Electronic elements 34 provided thereon may be provided on both the top surface 58a and the bottom surface 58b of PCB 58. Control electronics 34 control the operation of spin motor 50, the operation of actuator assembly 52, and the transfer of data to and from disk 48. PCB 58 is mounted to base 42 and electrically grounded to the HDA 32. As shown in FIGS. 3A–3E, the dimensions of disk drive 30 are defined by HDA 32. PCB 58, mounted to base 42 by a plurality of cap screws (as shown in FIG. 2), is designed to mount as close as possible to base 42. The range of dimensions of the disk drive of the present invention are: length 4"; width 2¾"; and height 0.5". The height dimension relates to a single disk embodiment of the disk drive; multiple disk embodiments may have an increased height dimension.

The above-described basic structure of disk drive 30 provides protection from shock and vibration. In particular, disk drive 30 will withstand non-operating shocks on the order of 100 g's and operating shocks, without nonrecoverable errors, of 10 g's. Non-operating vibration of 5.0 g's in the range of 10–500 Hz is the specified tolerable limit. Operating vibration, without nonrecoverable data, is specified at 0.5 g's for the range of 10–500 Hz.

Disk and Lubricant

Figure 4:
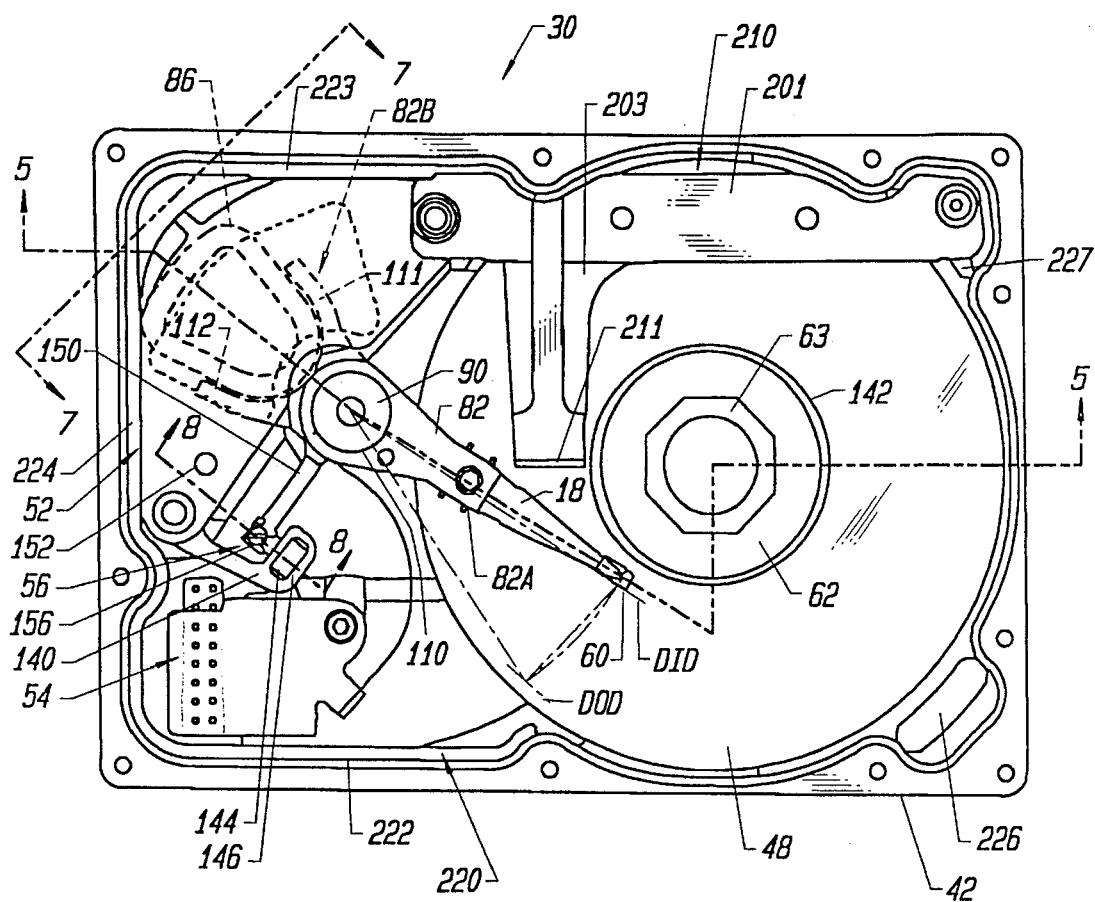
FIG. 4 is a plan, cutaway view of the disk drive of the present invention.

As noted above, disk drive 70 includes a storage disk 48 which may be comprised of an aluminum or glass substrate having a magnetic coating provided thereon. As shown in FIG. 4, the outside diameter (OD) of disk 48 is 65 mm and the inside diameter (ID) is 20 mm. Disk 48 has a data band defined by an inside data diameter (DID) of 37.38 mm (1.472 inches) and an outside data diameter of 61.97 mm (2.440 inches). Other characteristics of disk 48 and disk drive 30 are specified in Tables 1 and 2.

In one embodiment, disk 48 comprises an aluminum substrate with a magnetic coating, which provides a smoother disk surface than conventional aluminum substrates, and thus reduces the glide height of the heads thereon. Further, texturing of the disk surface is not required in drive 30 because of the use of the liquid bearing at the head disk interface. Disk surface roughness is considerably smoother than in conventional air bearing disk drives; peak-to-valley roughness is about 60 Angstroms for the disk. In one embodiment, disk 48 may be provided with a magnetic layer of cobalt-chrome-tantalum (CoCrTa) alloy at a thickness of 600Å, with a carbon overcoat having a thickness of 170Å, to achieve a magnetic coercivity of 1700 Oe. Such disks are available from Showa-Denka Corporation. Further, in air bearing drives a standard lubricant is adhered to the disk surface. In most cases, the disk lube is a type of perfluro-polyether. Such a disk lube is generally used in the drive of the present invention and may comprise a surface lube perfluro-polyether compatible with the liquid bearing lubricant where the liquid bearing lubricant is a perfluro-polyether. However, if the liquid bearing lubricant is a hydrocarbon, a surface lube hydrocarbon compatible with the hydrocarbon liquid bearing, such as isostearic acid, should be utilized.

In accordance with the present invention, a liquid lubricating bearing is disposed on the surface of the disk to provide an interface between the head and the disk. As discussed in U.S. Pat. No. 5,097,368, a non-Newtonian fluid is highly advantageous for this purpose. Several types of lubricant may be used in the drive 30, for example, a perfluro-polyether such as Galden D02, manufactured by Monteflorus, Milan, Italy, or a hydrocarbon such as Isopar L or Isopar M, manufactured by Exxon Corporation. Both fluids have low viscosity, a property which contributes to the problem of sealing the HDA. In addition, both such liquids act as a solvent for many of the components conventionally used in air bearing disk drives, necessitating modification of certain components of the drive of the present invention to accommodate the fluid bearing lubricant.

Both the perfluro-polyether and the hydrocarbon liquids have advantageous characteristics for use as the liquid bearing in disk drive 30. In particular, both liquids exhibit non-Newtonian shear stress to stress rate characteristics, and hence the velocity has a non-linear relationship with respect to the shear stress of heads 60, 61 therethrough. As discussed in the '368 patent, a non-Newtonian liquid bearing allows the head to fly at a relatively low flying height, approximately 1 microinch, while maintaining the uniform interface distance between the head and disk throughout the rotation of the disk. Several factors are considered when selecting between the perfluro-polyether and the hydrocarbon. Such factors include: viscosity—suitable hydrocarbons exhibit lower viscosity at various temperatures than suitable perfluro-polyethers, (and although perfluro-polyethers are available which have comparable viscosities over roughly equal temperature ranges, the vapor pressure of such perfluro-polyethers results in too rapid evaporation); density—perfluro-polyether has a density of 1.77 grams/cc versus 0.75 grams/cc for hydrocarbon; cost—perfluro-polyethers are approximately 20 times the cost of suitable hydrocarbon. In addition, the hydrocarbon provides greater wick lift height than that of the perfluro-polyether. Finally, the hydrocarbon exhibits a higher surface tension—25.9 dynes per $cm^2$ at 25° Centigrade to 18 dynes per $cm^2$ for the perfluro-polyether—which represents greater lift characteristics and better capillary sealing capabilities, but a lesser ability of the lubricant to wet the disk surface.

For purposes of the description, the characteristics of drive 30 will be described in an embodiment where a hydrocarbon is the liquid bearing fluid. Where applicable, considerations attendant use of a perfluro-polyether will be discussed. It is intended that the present invention not be limited to the use of any one particular type of liquid bearing fluid, and it should be understood that it would be well within the skill of a person of average skill in the art to develop a drive in accordance with the following description utilizing other types of liquid bearing fluids.

One of the most important problems to be solved in implementing a disk drive using a liquid bearing lubricant at the head disk interface is the application of the bearing lubricant and maintenance of the bearing lubricant on the disk surface in sufficient quantity to enable heads 60,61 to glide along at a specified height with respect to the disk surface.

In disk drive 30, a wick structure is utilized to provide bearing lubricant onto the disk surface. Wick structure 200, shown in FIG. 2, applies lubricant to both surfaces of disk 48 at all attitudes which disk drive 30 may encounter during normal operation. Wick assembly 200 is generally comprised of two portions: an applicator wick assembly 210,212 and a recirculating or "transport wick" structure 220. Applicator wick assembly 210,212 is designed to provide the bearing lubricant onto the surfaces of disk 48. Transport wick 220 is designed to recirculate the liquid bearing, which will be disposed throughout the interior of HDA 32 during use of the drive, and to provide the bearing liquid to applicator wick assembly 210,212 by capillary action. As noted above, only a finite amount of the bearing liquid will be provided in drive 30 at manufacture. Transport wick 220 is designed to make the most efficient use of this finite amount of liquid bearing. The quantity of liquid bearing fluid required for proper operation of drive 30 is about 2 cc, generally that which is sufficient to saturate the transport wick and applicator wick assemblies; a small amount of oversaturation is permissible.

As shown in FIG. 2, transport wick 220 has a shape generally corresponding to the interior cavity 41 of base 42. Planar regions 221A, 221B and 221C are designed to rest on the bottom surface of cavity 41 below disk 48 when disk 48 is mounted on spindle motor 50 in base 42. First side 222, second side 223 and third side 224 are designed to surround actuator assembly 52 and header assembly 54 of disk drive 30 opposite disk 48 when disk 48 is mounted in drive HDA 32. Finally, posts 226 and 227 reside in subregions 41A and 41B in cavity 41 and are provided to ensure that each corner of the interior of HDA 32 has a suitable transport wick area to collect and transport bearing lubricant. Transport wick 220 may be formed of a rigid porous material, such as porous stainless steel or a porous plastic, such as 5–10 micron polyethylene or 10–20 micron polyvinylidine fluoride. (In general, the polyethylene is used with the perfluropolyether and the PVDF with hydrocarbons, and the polyethylene with swell in the hydrocarbon fluids, and smaller pore sizes are required for perfluro-polyethers.) Capillary action draws fluid through transport wick 220, to applicator wick assembly 210,212, and onto disk 48 as disk 48 rotates and the applicator wicks contact the surfaces of the disk. Transport wick 220 thus can collect fluid from virtually any point in cavity 41 in the controlled environment defined in HDA 32. It is further noteworthy that there are no sharp corners in inter cavity 41, thereby preventing extreme concentrations of fluid at any one point. A portion of transport wick 220 occupies virtually every potential collection point in cavity 41 which allows disk drive 30 to be oriented such that any point may be the lowest point of the drive with respect to the force of gravity, while still enabling bearing lubricant to circulate to the applicator wick. It is noteworthy that the area of the transport wick is minimized within the controlled environment to that which is sufficient to encapsulate all regions necessary in the interior of the drive.

The applicator wick assembly is divided into two parts: applicator wick assembly 210 applies fluid to the upper surface of disk 48; and applicator wick assembly 212 applies lubricant to the lower surface of disk 48.

Upper applicator wick assembly 210 is comprised of four parts: a wick housing 201, a transport crossover 202, an applicator wick 203 and a cover plate 204. These parts may be riveted together and thereafter secured to actuator assembly 52 and boss 39 in base 42. Alternatively, these parts may be configured to snap together such that wick housing and cover plate 204 form an interference fit to secure transport crossover 202, and applicator wick 203 thereinbetween. Applicator wick 203 is manufactured of a glass fiber material, such as Millipore AP20 glass fiber having a thickness of about 0.015 inches. Wick housing 201 includes a wick spring 205 which induces a force (of about 3 grams) on applicator wick 203 in the direction of disk surface to ensure proper contact between applicator wick 203 and the surface of disk 48. Preferably, transport wick 220 and transport crossover 202 are formed from a porous material. A porous stainless steel is suitable for such use, however, a 5–10 micron porous polyethylene plastic is preferable because of its lower weight. Wick housing 201, wick cover 204 and wick spring 205 are preferably manufactured from flat 301 or 302 series stainless steel.

Lower wick applicator assembly 212 includes a wick spring 215 directly mounted to transport wick 220, an applicator wick 214 secured to the upper surface of planar region 221b, and a wick cover 216 secured over applicator wick 214 and to planar region 221b of transport wick 220.

Figure 2A:
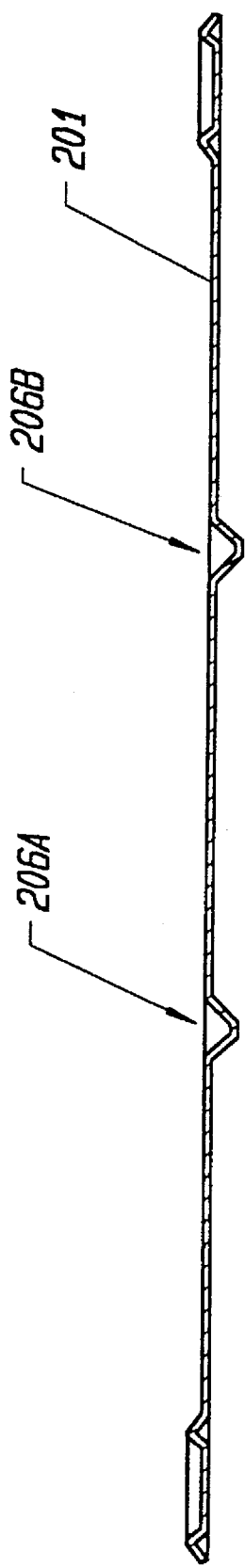
FIG. 2A is a view of the wick housing along line A—A in FIG. 2.

As shown in FIG. 2A, which is a cross-section of wick housing 201, conical divots 206A and 206B are provided in wick housing 201 to ensure contact between the transport crossover 202 and an applicator wick 203. Bores 207 and 208 are provided in transport crossover 202 and applicator wick 203, respectively, to allow for the protrusion of conical divots 206A and 206B therethrough. Likewise transport wick 220 includes bores 219, applicator wick 214 includes bores 217, and wick cover 216 includes bores 218 therein to ensure proper fluid contact between the parts.

End portion 211 of applicator wick 203 is positioned adjacent the inside diameter 142 of disk 48. Bearing fluid will be transported to the outer diameter of disk 48 by centrifugal force as the disk rotates with respect to applicator wick 203. In addition, while it is conceivable that an applicator wick having a width which is the entire data band track, it is preferable to minimize the area of the applicator wick 211 which contacts the disk surface to reduce the drag exhibited by applicator wick against disk 48. Applicator wick 214 is positioned in a like manner against the lower surface of disk 48.

Figure 11:
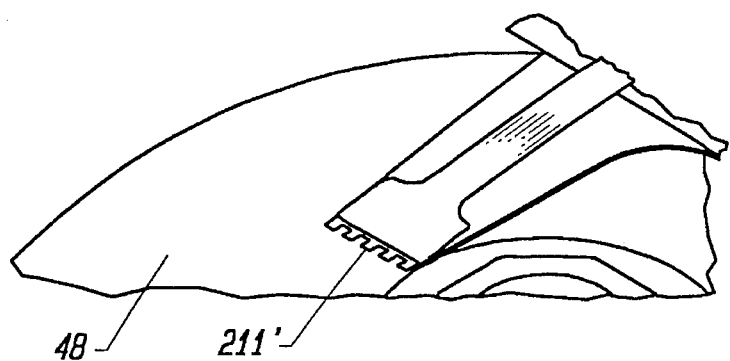
FIG. 11 is a side view of an alternative applicator wick for use in the disk drive of the present invention.

Both the drag of heads 60,61, and that of applicator wicks 211,214, contribute to the total amount of drag on the disk surface. This drag can have the effect of significantly reducing the reliability of the drive, increasing power consumption, and the drive's overall performance characteristics. It has been determined by the inventors of the present drive that the area of the applicator wick which is adjacent to disk surfaces the significant contributing factor to the drag of the wick itself. Alternative wick configurations may be utilized in accordance with the present invention. For example, as shown in FIG. 11, an applicator wick 212, having a first end with a width equal to the width of the data track may be utilized. A comb-like structure at the wick-disk interface is utilized to reduce the total area in contact with the disk to reduce drag. In one aspect, (not shown) the wick could be a width equal to the width of the data track. Thus, wick segments in contact with the disk occur at various radii with respect to the rotational axis of the motor.

An additional critical concern in utilizing a liquid bearing fluid in a storage device is the prevention of leakage of the bearing lubricant from the drive. In particular, when using a drive having a base and cover, along with certain access points in the base and/or cover, the potential for leakage from such interfaces is significant.

The potential for leakage of the bearing fluid from disk drive 30 occurs at several points. The most significant potential leakage point is the interface between cover 44 and base 42. Base 42 is designed in a "bathtub"-type fashion. In general, a bathtub-type base has an outer wall and well region into which the components of the drive are installed. Such a drive is in contrast to the "flat" base plate design, wherein the base as a roughly planar top surface, allowing the major components of the drive to be easily mounted on the top surface of the base. Base 42 includes an outer wall 36 and cavity 41 into which the major components of the drive are fitted. Wall 36 lines the periphery of the base plate, and extends upwardly from the planar, cover mounting surface 37 of base 42. Cover 44 includes a groove 40 (shown in FIG. 5) which conforms to the shape of periphery wall 36, and in which gasket 36 may be seated. Wall 36 and groove 40 in cover 44 form an interference fit, with gasket 36 disposed thereinbetween to prevent leakage at the base/ cover interface. A total of 9 hex screws 49 secure cover 44 to base 42 with sufficient force to maintain the integrity of the controlled environment at the pressures and temperatures herein defined. An additional method for ensuring a complete seal for disk drive 30 of the present invention is to provide a secondary seal in addition to the gasket and interference fit of the base and cover. In one aspect, the interference fit may comprise an epoxy sealant in a bead form surrounding the point of contact where base 42 and cover 44 engage each other. In another aspect, a thin groove may be provided in the cover and base adjacent the contact points therebetween on the outer surfaces of the drive. Once base 42 and cover 44 are fit together, a thin strip of metal is provided in the groove, with the width of the strip sufficient to completely cover the area region where base and cover meet, around the entire periphery of the drive.

Other points of leakage occur at the regions of base 42 which are exposed to the ambient environment.

Figure 10:
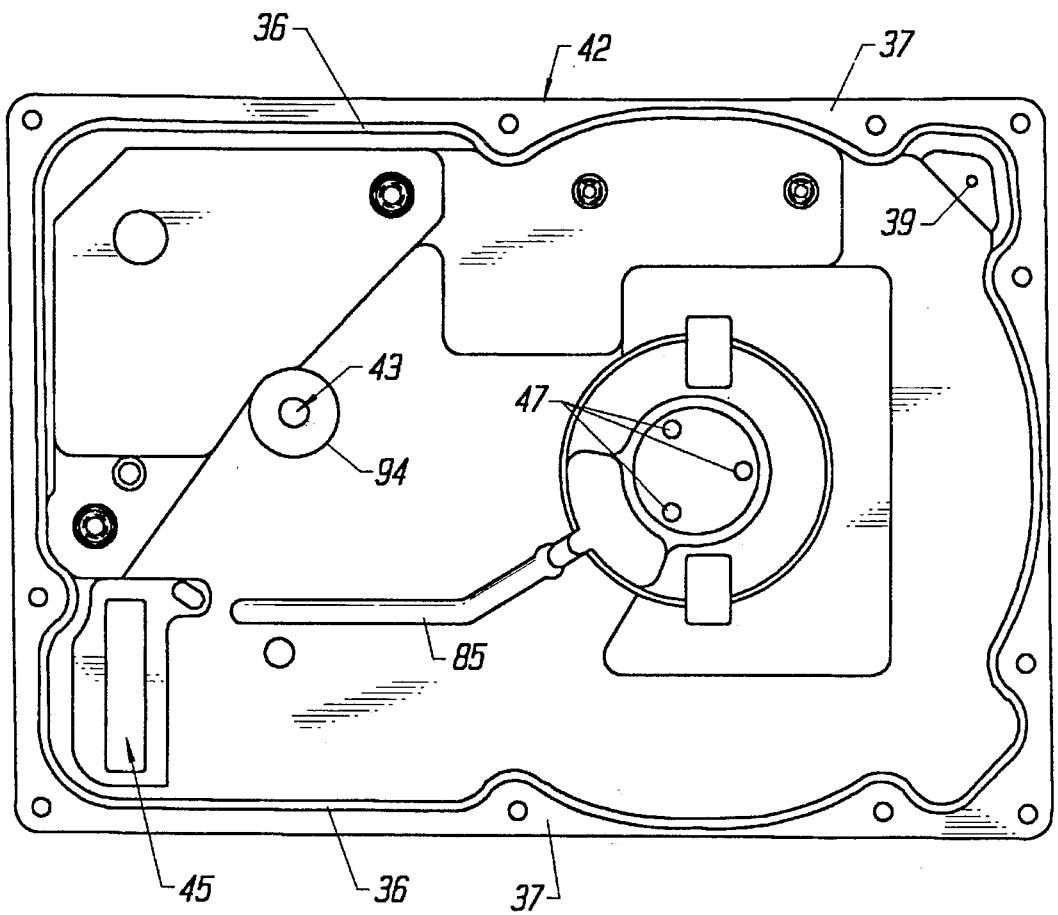
FIG. 10 is a plan view of the base plate of the disk drive of the present invention.

FIG. 10 is a plan view of base plate 42. As shown therein, there are three areas where through-holes are provided in the base plate: header port 45; actuator shaft bore 43; and spin motor mounting bores 47. All three areas create potential interfaces between the controlled environment at the interior of disk drive 30 and the ambient environment. In each case, a particular method for solving the problem of bearing liquid leakage from the drive is implemented. Each of the specific leakage issues will be discussed in further detail below in conjunction with the description of the spin motor, header and actuator assemblies.

With respect to the interference fit between base 42 and cover 44, it is important that manufacturing tolerances be strictly maintained to ensure an adequate seal between the components. In this respect, the periphery wall 36 is machined to be within tolerances of 0.001 inch. This ensures that the only a minimal amount of the gasket is ever exposed to the liquid bearing lubricant in the drive. In this respect, the fluid is prevented from leaking at the cover/base interface.

Yet another important design consideration in incorporating a liquid bearing into disk drive 30 is ensuring compatibility between the liquid bearing and the various materials used in the manufacture of drive components. Critical material compatibility issues arise between the liquid bearing fluid and (1) the grease typically used to lubricate the bearings used in the spin motor and actuator; (2) the adhesives used in the manufacture of the spin motor and actuator flex circuits, and the spin motor and actuator bearing assemblies; and (3) the plastics used to fabricate certain parts. In all cases, the solvent characteristic of the liquid bearing has created compatibility problems. In the case of bearing grease, it has been found that the bearing lubricant tends to enter the bearing cartridge and transport the grease into the controlled environment and onto the surfaces of disk 48. The liquid bearing fluid also tends to dissolve the some adhesives used in drive assembly, and tends to increase outgassing from some plastics conventionally used in air bearing drive manufacture. Each of these material compatibility issues, and the solutions adapted for each, will be discussed with respect to particular drive components.

Spin Motor

Figure 5:
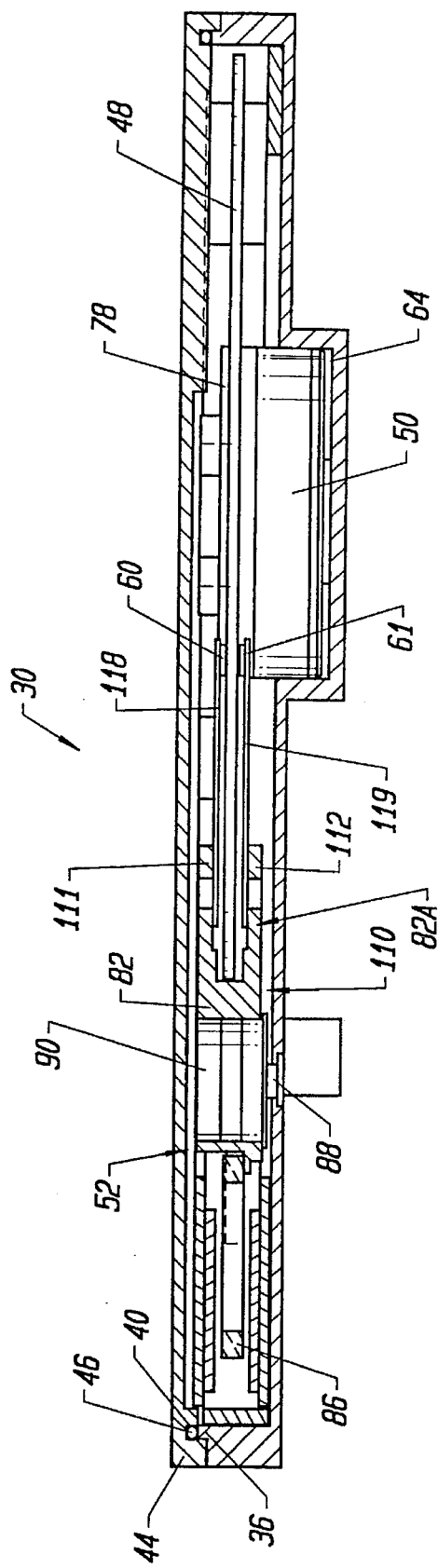
FIG. 5 is a cutaway, side view of the disk drive along line 5—5 in FIG. 4.
Figure 5A:
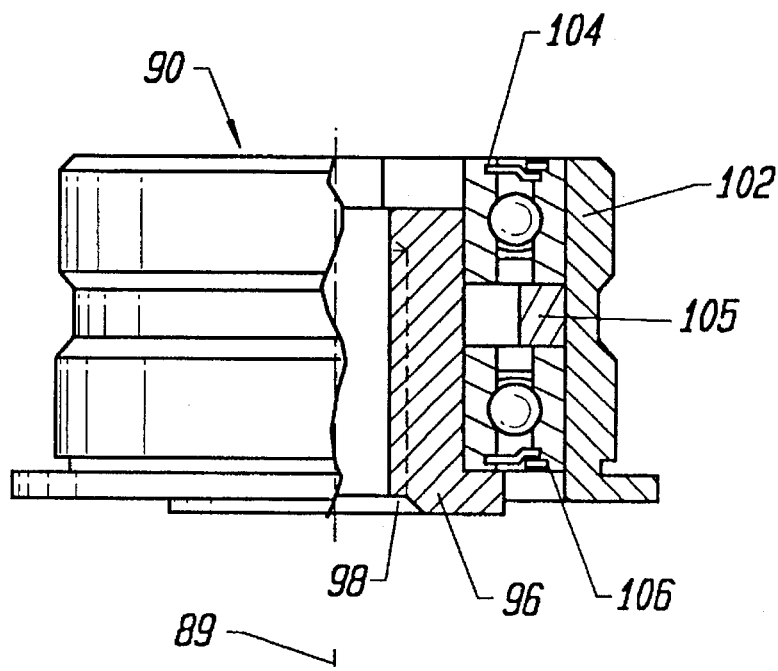
FIGS. 5A and 5B are exploded, cutaway views of the actuator bearing assembly of the disk drive of the present invention.
Figure 5B:
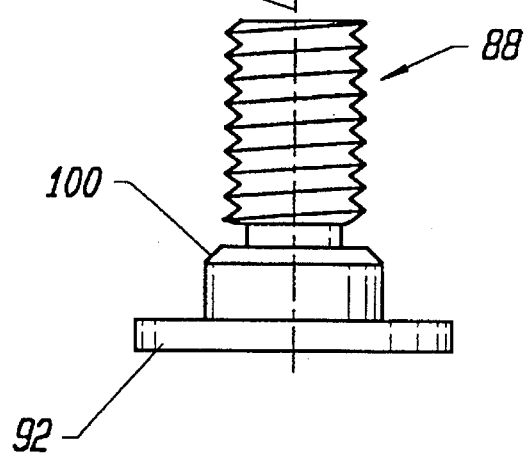
Figure 5C:
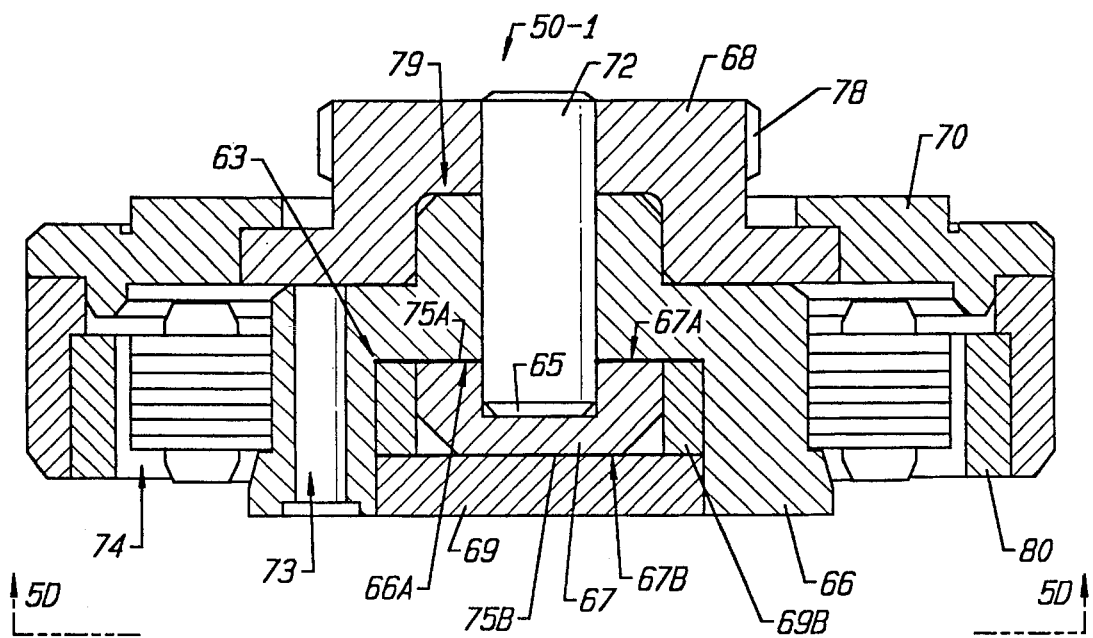
FIG. 5C is a side, cutaway view of a first embodiment of the spin motor of the disk drive of the present invention.
Figure 5D:
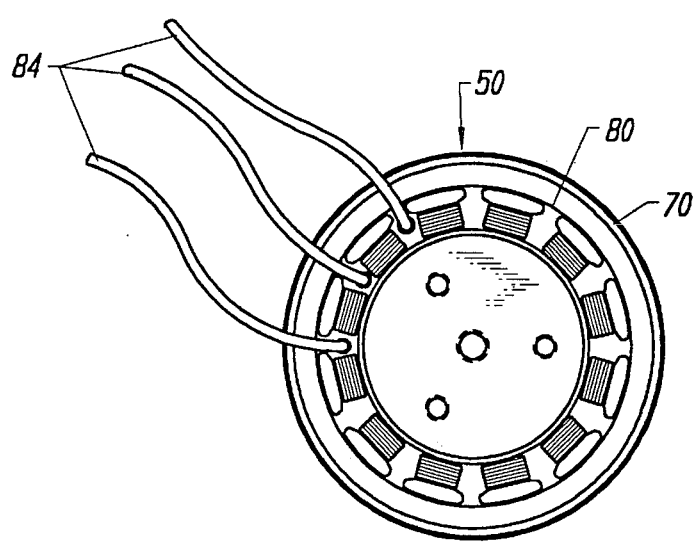
FIG. 5D is a bottom view of the spin motor shown in FIG. 5C.

A first embodiment of a spin motor 50 suitable for use with the disk drive of the present invention is shown in FIG. 5C. Spin motor 50 supports and rotates disk 48. As shown in FIGS. 2 and 5, spin motor 50 sits in a well 64 in base 42. As shown FIGS. 5C, motor 50-1 is an under-the-hub, rotating shaft-type motor which recirculates a hydrocarbon oil to provide lubrication for motor and prevent wear in the drive. The hydrocarbon oil lubricant used in the drive has a viscosity of about 30 centipoise.

Spin motor 50-1 includes an outer hub 70 mounted to an inner hub 68. A bearing housing 66 supports inner hub 68, outer hub 70, shaft 72, thrust bearing 67 and a stator assembly 74 including a stator lamination and windings. A clamp ring 78 is secured by a single hex nut 63 which is screwed onto a threaded portion of outer bearing housing 68, and functions to secure disk 48 to hub 70 for rotation therewith. A rotor comprising a multi-pole magnet 80 having a ring-like structure is mounted on hub 74 so that the magnet 80 is adjacent to and concentric with stator assembly 74. Magnet 80 has 8 poles which, in conjunction with the 12 slot/windings of stator lamination provide a high torque with a minimum spin up time of 5 seconds.

Inner bearing housing 66 includes an inner cavity 63 in which a base element 69a and spacer element 69b. A shoe 67 rests in the cavity formed by base element 69a and spacer element 69b. A shaft 72 is press fit into thrust bearing 67 and supports outer bearing housing 68. Inner bearing housing 68 secures motor 50-1 in drive 30 by means of three threaded mounting screws (not shown) provided in bores 73 (one shown) in inner bearing housing 66. To ensure proper sealing of the drive at the point of entry of the threaded mounting screws through base 42, the threaded mounting screws are covered with an epoxy resin adhesive. This adhesive, in conjunction with the sealing effect provided by the threaded screws themselves, yields an effective seal for the drive over the pressure ranges specified herein.

Two thrust bearings 75a and 75b are provided at the upper and lower surfaces 67a and 67b of shoe 67, which interact with an inner surface 66a of inner bearing cavity 63 and the upper surface $69a_1$ of base 69a. Base 69a and spacer 69b are secured to inner bearing housing 66. Shaft 72 and shoe 75 are allowed to rotate on thrust bearings 75a and 75b on a film of the hydrocarbon oil lubricant. Both upper surface $69a_1$ of base 69a and inner surface 66a of inner bearing cavity 63 include herringbone grooves, approximately 0.0006" deep, positioned such that fluid is caused to flow toward the apex of the successive "v" shaped grooves forming the herringbone pattern thereby forcing the fluid to remain centered with respect to the radius of the upper and lower surfaces of shoe 67. A journal bearing 71 is formed by shaft 72 and the inner diameter of a bore 77 through which shaft 72 couples to shoe 67. Spiral grooves are provided on the inner diameter of bore 77 with fluid provided at gap 75 to allow lubricant to provide a film between shaft 72 and the inner diameter of bore 77. The action of journal bearing 71 causes the motor bearing lubricant to remain centered with respect to the shaft.

A barrier film is provided at point 79 where the shaft is exposed to the area between inner bearing housing 66 and inner hub 68. Point 79 is the only location on shaft 72 where the hydrocarbon oil which is used to lubricate the spindle motor may potentially be exposed to other fluids in the drive. The barrier film is comprised of a solid hydrocarbon film which effectively prevents interaction between the hydrocarbon oil lubricating spindle motor 50-1 and the liquid bearing lubricant for the head/disk interface. The clearance between inner bearing housing 66 and shoe 75 is 0.005 inch; thus the thrust bearings provide the majority of the stability of motor 50-1. In this manner, hub 70, outer bearing housing 68 and the disk coupled thereto are allowed to rotate about rotational axis A in the center of spindle motor 50-1.

While the aforementioned embodiment of spindle motor 50-1 is suitable for use with the majority of hydrocarbon films, if the liquid bearing lubricant for the head disk interface comprises a perfluro-polyether, the barrier film may eventually degrade over time and the hydrocarbon oil used to lubricate the spindle motor will be carried out of the spindle motor into the perfluro-polyether in the drive where it will act as a contaminant.

Figure 13:
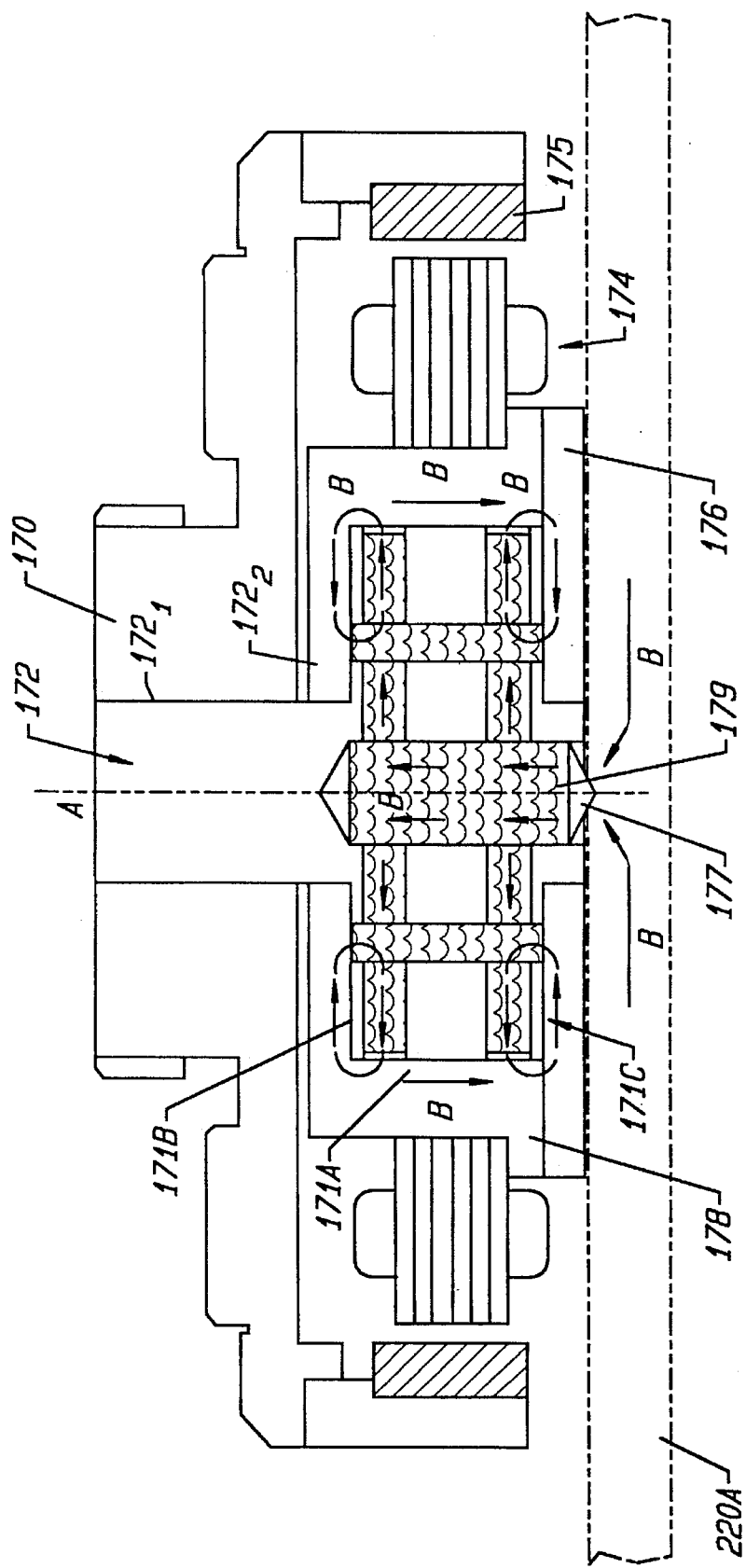
FIG. 13 is a side, cross-sectional view of a second embodiment the spin motor of the disk drive of the present invention.

Thus, a second embodiment of spindle motor 50 is shown in FIG. 13. The second embodiment of spindle motor 50 may be used with either a hydrocarbon or a perfluropolyether liquid bearing at the head disk interface as such embodiment utilizes the liquid utilized at the head disk interface to provide lubrication for the spindle motor.

Figure 13A:
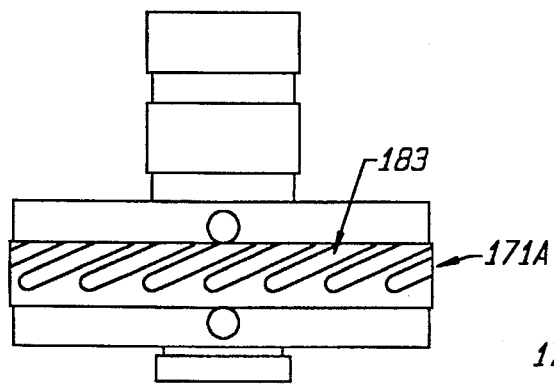
FIGS. 13A–13B are a side view and cross-sectional view of the shaft used in the second embodiment of a spin motor in accordance with the present invention.
Figure 13B:
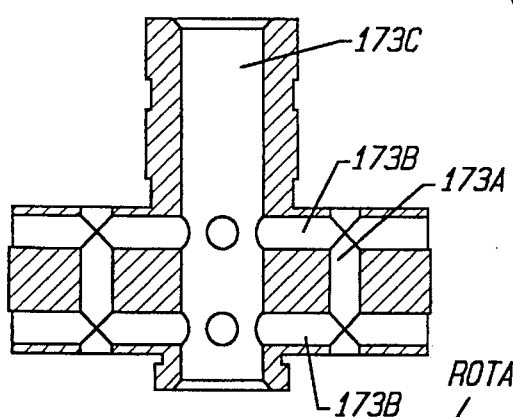

As shown in FIG. 13, spindle motor 50-2 includes an aluminum hub 170 supporting a multi-pole ring magnet 175 thereon coincident with a stator assembly 172, including stator lamination and windings. Hub 170 is mounted to shaft 172 for rotation about a rotational axis A. A bearing housing 178 rests on base 176 and supports shaft 172. In accordance with the present invention, motor 50-1 includes means for circulating the liquid bearing material through the motor to utilize the fluid to prevent wear in the motor. In particular, bearings are provided at 171 a–c between bearing housing 176 and shaft 172 to circulate fluid in the direction indicated by arrows B, as discussed specifically with respect to FIGS. 13A–13D. FIG. 13B shows a cross-sectional view of shaft 172. Bores 173 are provided in shaft 174 to allow a porous plastic material 179, such as such as 5–10 micron polyethylene or 10–20 micron polyvinylidine fluoride, to be inserted into shaft 72. Bores 173 provide a total of 8 radial, horizontal bores 173b and 4 vertical radial bores 173a. A central bore 173c is also provided. A porous pick-up wick 177 is coupled to the porous plastic material 179 and is in contact with a portion 220a of transport wick 220 which is, in accordance with the use of spin motor 50-2, adapted to include portion 220a extending under the center of the spindle motor. Pick-up wick 177, in contact with transport wick portion 220a, draws fluid bearing material when a rotational force about axis A is generated by the stator and magnet assemblies. Experimental observations have shown that a meniscus is formed adjacent to the sides of pick-up wick 177 which establishes a fluid path for the motor.

Figure 13D:
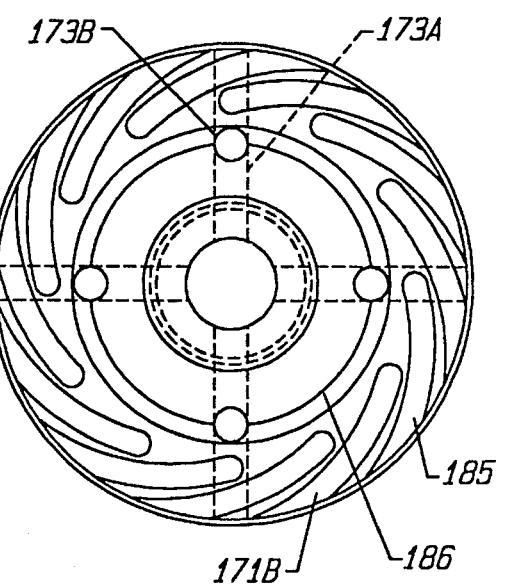
FIGS. 13C–13D are top and bottom views, respectively, of the shaft of the second motor embodiment.
Figure 13C:
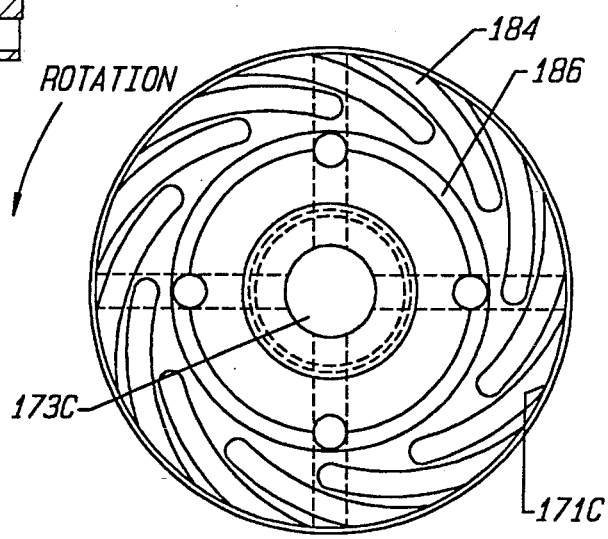

As fluid bearing material is drawn into porous material 179 in shaft 172, the material circulates therethrough after saturating the material, providing continuous replenishment of fluid at the bearing surfaces. Bearings 171a–171c are established by the provision of grooves on the outer surfaces of shaft 172. As shown in FIG. 13A, groves 183 provided in the side of shaft 172 establish bearing 171a and direct fluid flow in a downward direction when shaft 172 is rotated counter-clockwise. As shown in FIGS. 13C–13D, which are top and bottom views of, respectively, of shaft 172, thrust bearings 171b and 171c are established by the provision of grooves 184 and 185, respectively. Bearing fluid flows in the direction as shown by arrows B in FIG. 13. The porous material 179, in addition to providing a transport medium within the bearing, also serves as a reservoir to retain fluid while the bearing is stopped for extended periods. The porous structure prevents fluid from being drawn back into transport wick 220a,220.

As with all components of drive 30, manufacturing tolerances for motor 50-2 are exacting to ensure proper operation. Shaft 172 may be formed of series 303 stainless steel, with a passivate finish. The clearance between bearing housing 178 and shaft 172 at the surfaces defining bearings 171a–171c is on the order of 0.000205–0.000235 inch. Grooves 183–185 are generally formed to be about 0.00030–0.00040 inch deep at 18°± 0°15' apart. Bearing housing 178 and thrust plate 176 may be formed of bronze. Also as shown in FIG. 13, shaft 172 may comprise a two piece assembly of post 172₁ and body 172₂; in such embodiment, post 172₁ is press fit or bonded into body 172₂.

Figure 14:
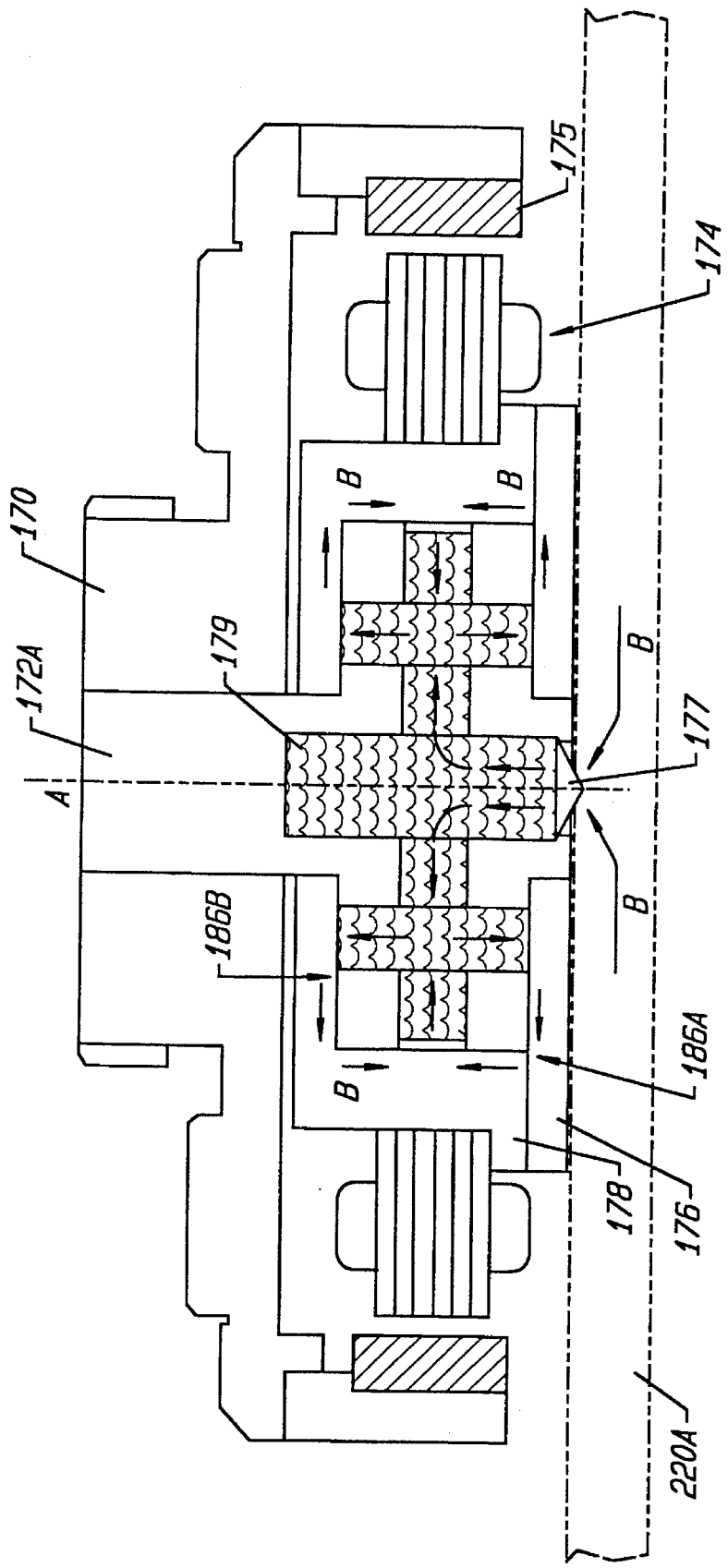
FIG. 14 is a side, cross-sectional view of a third embodiment the spin motor of the disk drive of the present invention.

A third embodiment of spin motor 50 is shown in FIG. 14. Like reference numerals denote parts equivalent to those shown with respect to FIG. 13. Spin motor 50-3 is similar to spin motor 50-2, however, fewer and larger bores are provided, and the journal and thrust bearings are defined in a slightly different manner.

As shown in FIG. 14B only four radial horizontal bores and four vertical radial bores are provided, with the bores having a diameter larger than bores 173a, 173b of spin motor 50-2. The provision of larger bores makes insertion of solid porous material 179 into the bores easier. In addition, the sides of shaft 172a do not include grooves in the journal bearing sections 186c,186d. Thrust bearings 186a, 186b are formed by the provision of grooves 188 and 189 on the upper and lower surfaces, respectively, of disk shaft 172, shown in FIGS. 14C and 14D, respectively. Grooves 188 and 189 are generally formed to be between 0.00030 and 0.00040 inch deep and generate fluid flow in the outward radial direction shown in arrows B in FIG. 14. The pressures generated in thrust borings 186a and 186b also pressurize journal bearings 186c and 186d, respectively; thus eliminating the need for grooves in the journal bearing surfaces to generate pressure. Again, the tolerances between bearing housing 178 and shaft 172a and the journal bearing interfaces is on the order of 0.000205–0.000235 inch.

Thus, no conventional grease lubricants are used with respect to the spindle motor assembly. The various embodiments of the spindle motor of the present invention utilize different methods for recirculating the fluid of the disk drive of the present invention and allow any number of fluid bearings to be utilized at the head/disk interface.

Actuator Assembly

Actuator assembly 52 will be described with reference to FIGS. 2, 4, 5, 5A, 5B, 6, and 9. Actuator assembly 52 performs the function of positioning heads 60, 61 with respect to disk 48.

An actuator arm 82 is molded as part of arm body 110, manufactured of aluminum, and supports heads 60, 61, mounted at a first end 82a of actuator arm 82. An actuator coil 86 is mounted at a second end 82b of actuator arm 82. Actuator arm body 110 is mounted on base 42 by an actuator post 88 and a bearing cartridge 90 which is threaded onto actuator post 88. Actuator post 88 has a post base 92 which is press fit into a boss 48 having recessed portion 94 in base 42. A small amount of adhesive is provided at the circumference of post base 92 to ensure a seal between post base 92 and boss recess 94. An epoxy adhesive such as Hysol 9320, manufactured by Dexter Corporation is suitable for this use. Post base 92 has a large diameter which creates a high aspect ratio, and thus the ability to press fit post base 92 and boss recess 94 so that the central axis 89 of actuator post 88 is orthogonal to the plane of base 42.

With reference to FIG. 5A, bearing cartridge 90 has an inner shaft 96 which is threaded to screw onto actuator post 88 (FIG. 5B). Shaft 96 has a mounting surface 98 which interfaces with the top surface 100 of post base 92, the same surface used to register actuator post 88, thereby assuring that the bearing cartridge 90 rotates about the central axis 89 of actuator post 88. Housing 102 of bearing cartridge 90 is rotatably mounted by first and second bearings 104,106 about inner shaft 96. Spacer 105 is positioned between bearings 104,106 to ensure proper spacing of the bearings in the assembled bearing cartridge 90. Bearing cartridge 90, including housing 102, post 88 and spacer 105 are preferably manufactured from series 303 stainless steel and provided with passivate finish. Actuator arm body 110, including all of the components attached thereto, is precisely balanced, i.e., equal amounts of weight are provided on either side of the pivot axis 89 so that the pivoting of actuator arm 82 to position heads 60, 61 has a low susceptibility to linear shock and vibration.

In a fashion similar to spin motor 50, bearings 104, 106 may be lubricated with the liquid bearing lubricant used as the head-disk interface. Because of the low velocity of the actuator bearings in relation to that of the spin motor, it has been determined that there is no additional need to provide means for recirculating the bearing fluid in the ball-bearings utilized in the actuator design.

Figure 6:
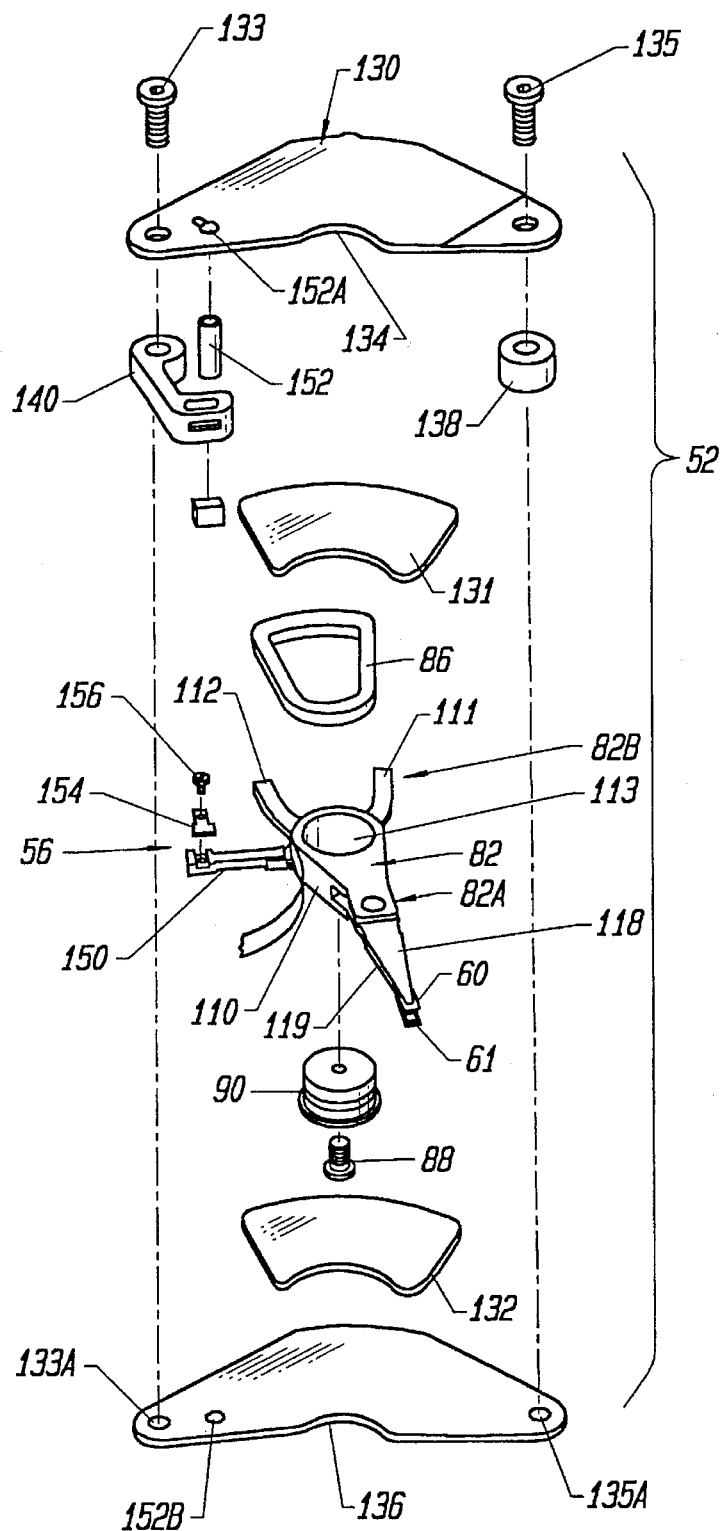
FIG. 6 is an exploded, perspective view of the actuator assembly of the disk drive of the present invention.

With reference to FIGS. 4 and 6, arm body 110 includes arms 111, 112 for supporting actuator coil 86, and a mounting hole 113 for engaging outer member 102 of bearing cartridge 90. Bearings 104,106 are press-fit into housing 102 and secured to the interior of housing 102 and shaft 96 by an adhesive, such as Hysol 9320.

First and second load beams 118, 119 are staked to respective ones of actuator arms 111,112. Load beams 118, 119 are, for example, Type 8 manufactured by Hutchinson, having down-facing rails. First and second flexures (not shown) support respective ones of heads 60, 61 on respective ones of load beams 118, 119.

The force necessary to pivot actuator arm 82 is created by a voice coil motor including coil 86 and a magnet structure 130. Magnet structure 130 includes two bipolar magnets 131,132, mounted to top and bottom plates 134, 136, respectively, and support posts 138 and latch body 140. Top and bottom plates 134,136, support post 138, and latch body 140 function as returns for the magnetic fields provided by magnets 131,132. It is important that there are no air gaps between support post 138, latch body 140 and top and bottom plates 134, 136; any air gap would create a discontinuity in the return, greatly reducing the strength of the magnetic fields. The components of magnet structure 120 are formed of magnetically permeable material to provide returns for the magnetic fields generated by magnets 131, 132. Magnet structure 130 and actuator coil 86 are arranged so that coil 86 is placed in the magnetic fields created by magnets 131,132. Currents passing in coil 86 create torques so that actuator arm 82 may be pivoted to position heads 60, 61 at selected locations with respect to disk 48.

As shown in FIG. 6, latch body 140 is secured between top plate 134 and bottom plate 136 by a hex screw 133 secured in threaded bore 133a in bottom 136. Likewise, support post 138 is secured between plates 134 and 136 by hex screw 135 into threaded bore 135a in bottom plate 136. However, screw 135 is also used to secure one portion of wick housing 201 in drive 30.

Actuator assembly 52 provides average access times of less than 20 milliseconds, due to the high power-to-mass ratio and the small moment of inertia of actuator arm 82.

As heads 60,61 travel over the surface of disk 48, a drag is associated with the movement of the heads through the liquid bearing lubricant disposed on the disk surface. It is critical in the disk drive 30 that this drag be minimized to maintain acceptable performance levels in the access time and seek performance of the drive. The amount of acceptable drag is a function of the torque which is provided by actuator assembly 52 and spin motor 50. Discussed in co-pending application Ser. No. 07/976,422, are various embodiments of 2-pad, 3-pad, and 4-pad read/write heads designed for use in conjunction with disk drive of the present invention. Application Ser. No. 07/976,422, is hereby incorporated by reference.

When the above-described actuator assembly is used in conjunction with the read/write heads discussed in co-pending patent application Ser. No. 07/976,422, a load of about 5 g is provided on heads 60,61 such that when heads 60,61 travel over disk 48 rotating at approximately 3000 rpm, the head disk interface spacing will be on the order of 1 microinch or less.

A crash stop is provided to limit the pivoting movement of actuator arm 82 so that heads 60,61 travel only between a landing zone 142, positioned at the inner diameter of disk 48, and outside data diameter DOD of disk 48. A landing zone (or non-data area) 142 is located, e.g., adjacent to the inside diameter DID and the actuator assembly 52 positions the heads 60, 61 over landing zone 142 during parking. The landing zone 142 may be any selected portion of the disk 48; however, a portion of disk 48 adjacent to the DID or DOD is usually selected.

Figure 7:
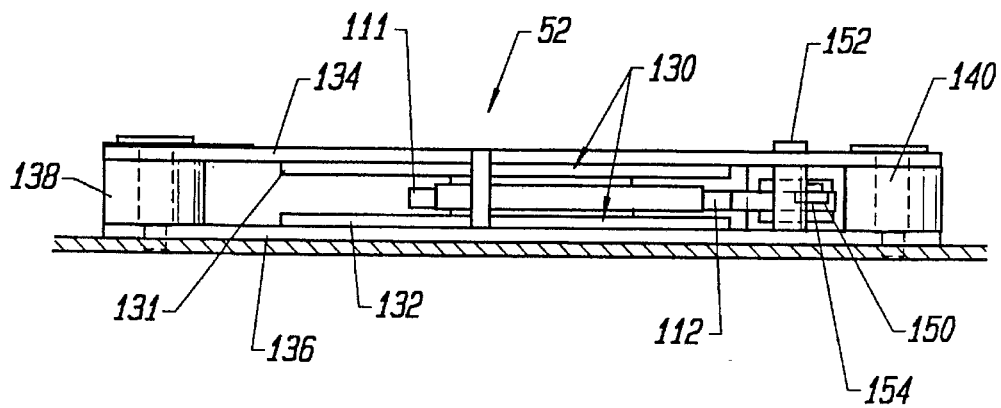
FIG. 7 is a side, cutaway view along line 7—7 in FIG. 4.

With reference to FIGS. 4, 6, 7 and 8, latch arm 150, which is formed as a part of arm body 110, contacts both an inside diameter crash stop and an outside diameter crash stop. Outside diameter crash stop is provided by a post 152 which fits in bores 152a and 152b provided in top plate 134 and bottom plate 136, respectively. When the pivoting motion of actuator arm 82 places heads 60, 61 at the DOD of disk 48 latch arm 150 contacts outside diameter crash stop 152 (FIG. 7). Top plate 130 and sleeve 152 may be removed to allow actuator arm 82 to pivot so that heads 60, 61 are not over disk 48, thereby permitting removal of disk 48. The inside diameter crash stop is provided by a portion of the latch mechanism and is described below.

Figure 12:
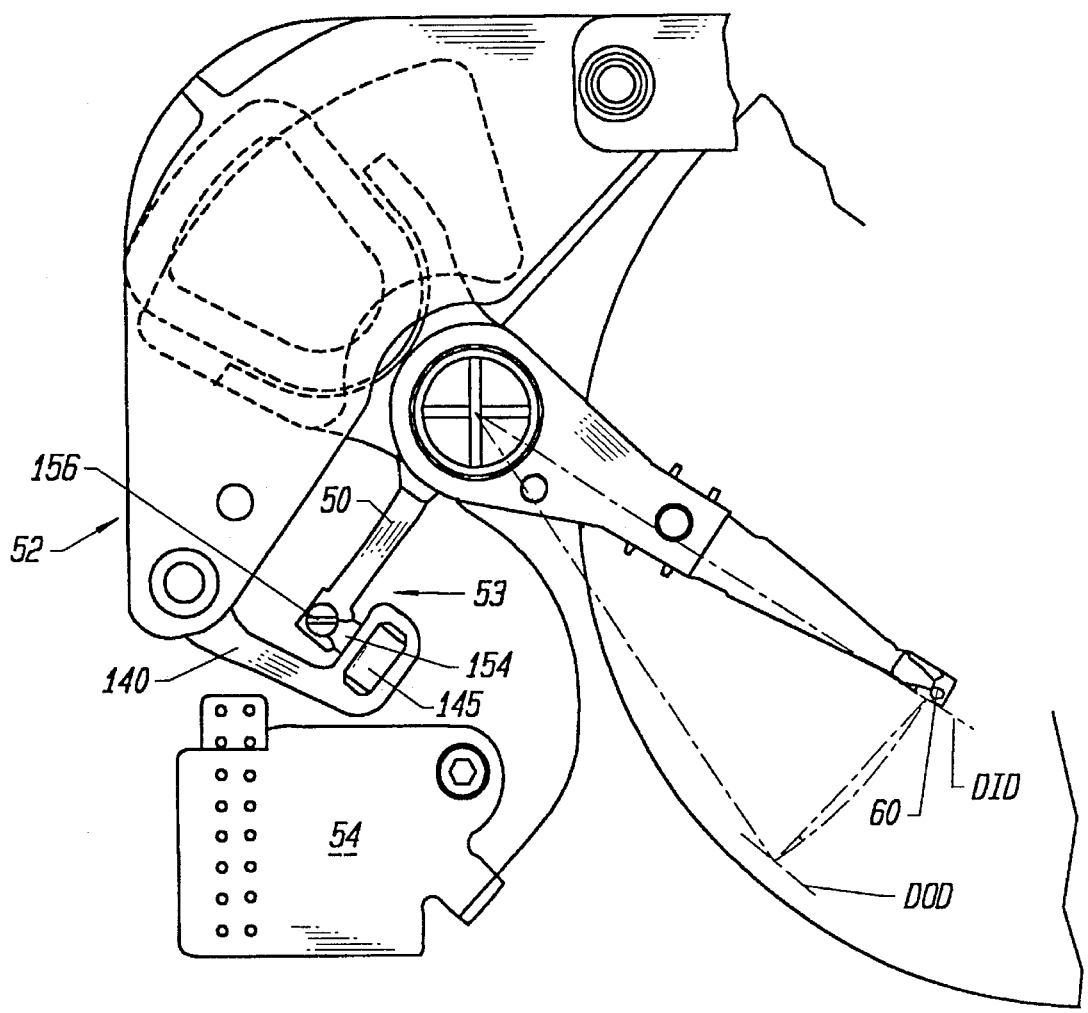
FIGS. 12—12A show an alternative embodiment of an actuator assembly for use in accordance with the present invention.
Figure 12A:
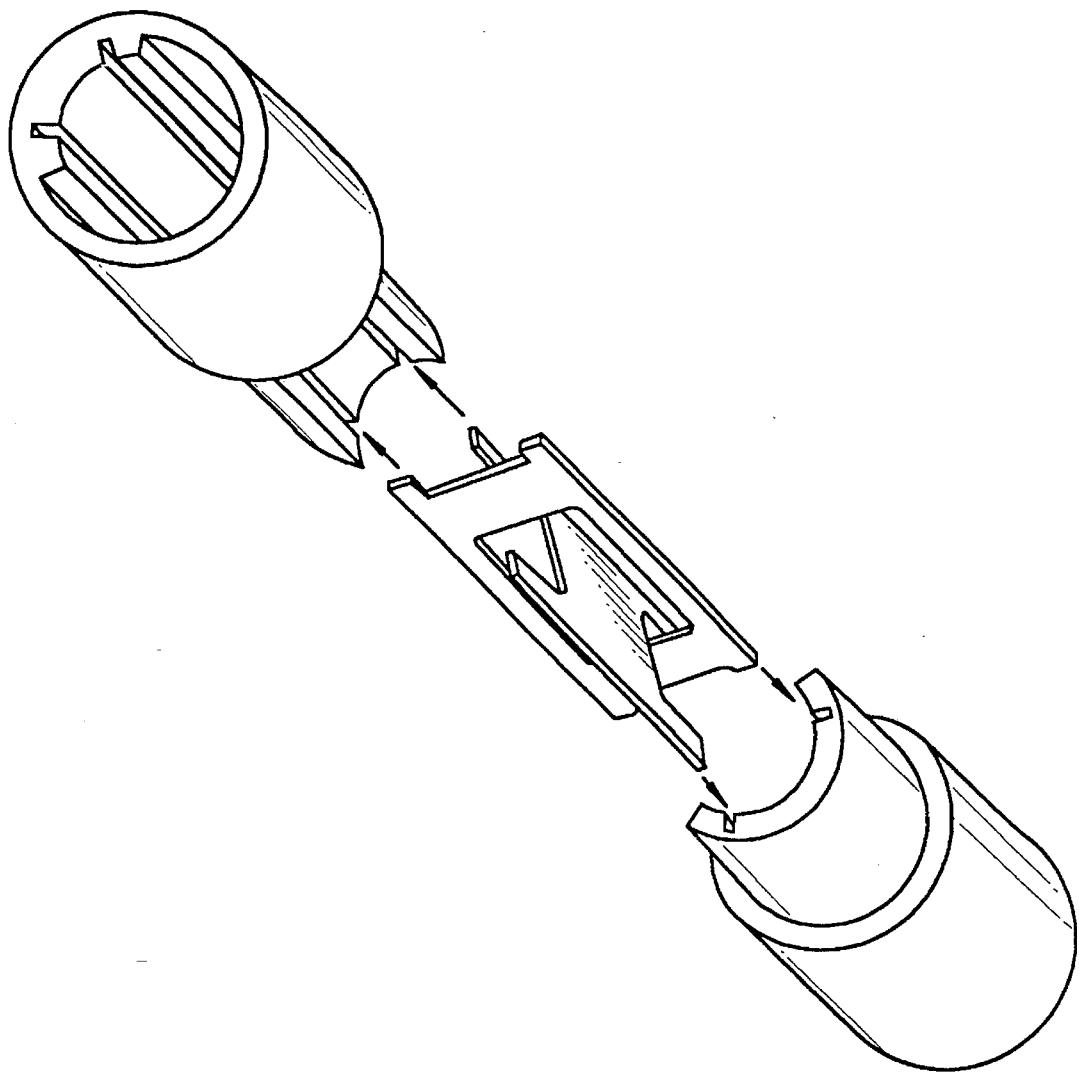

An alternative embodiment of actuator assembly 52 is shown in FIG. 12. As shown therein, bearing cartridge 90 has been replaced by a cross-hair spring, available from Lucas Aerospace Power Transmission Corporation. The use of the cross-hair spring, as shown in FIG. 12, reduces the possibility of contamination, and the need for any lubrication on any bearings to support rotation of actuator arm body 110.

In the alternative embodiment of the actuator assembly shown in FIG. 12, it should be noted that the torque constant for the cross-hair spring is different from the bearing assembly used in the first embodiment of the actuator assembly. It is generally necessary to modify the control means, for example the software seek routines, to accommodate use of the alternative embodiment of the actuator assembly.

Latch Assembly

Latch assembly 56 will be described with reference to FIGS. 4, 6, 7 and 8.

Figure 8:
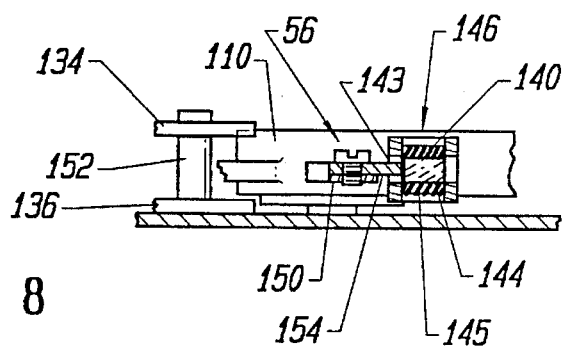
FIG. 8 is a side, cutaway view along line 8—8 in FIG. 4.

The purpose of latch assembly 56 is to lock actuator arm 82 in a position where heads 60, 61 are located over the landing zone 142 of disk 48. Latch mechanism 56 includes latch body 140, latch arm 150, and latch pin 154. Latch pin 154 is secured to latch arm 150 by a cap screw 156 secured in bore 158 of actuator arm 140. A magnet 144 is positioned in a bumper 145 in cavity 146 of latch body 140. Bumper 145 is generally a rubber material, such as a Viton. As shown in FIGS. 4 and 8, when heads 60,61 are positioned over landing zone 142, pin 154 enters a gap 148 in latch body 140 and engages bumper 145 under the active forces of magnet 144. Latch magnet 144 provides a magnetic field fringing about gap 143 in latch body 140 to trap pin 154, as discussed in U.S. patent application Ser. No. 07/643,703 entitled MAGNETIC PARKING DEVICE FOR DISK DRIVE.

Header assembly 54 transfers data and control signals from control electronics 34 on PCB 58 to the controlled environment between base 42 and cover 44. Header assembly 54 will be described with reference to FIGS. 9 and 9A. Header assembly 54 includes an actuator flex circuit 160 to provide electrical connections to heads 60, 61 and actuator coil 86, mounted on rotating actuator arm 82. A molded plastic flex circuit bracket 164, manufactured from a material such as ULTEM 1000, has a shape generally corresponding to the shape of posterior portion 162 of flex circuit 160, and supports and retains flex circuit 160 in drive 30. Connector pins 166 are embedded in a plastic header 165, and header 165 is potted into base 42. An epoxy sealant, such as Hysol 9320 is utilizes to seal header 165 into base 42 and prevent leakage of bearing lubricant at this interface with the ambient environment. Pins 166 connect directly to a reverse entry connector on PCB 58.

Figure 9:
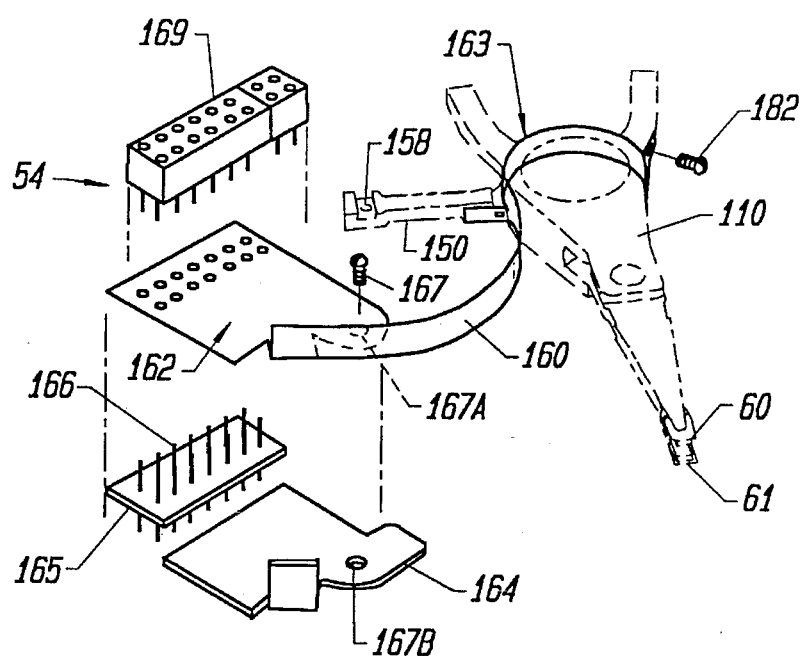
FIG. 9 is an exploded, perspective view of the header assembly and flex circuit of the present invention.

Flex circuit 160 is a reverse flex circuit. A connector 169 is secured to posterior portion 162 of flex circuit 160. Connector 169 engages pins 166 to provide coupling to the electrical leads on actuator flex circuit 160. Posterior portion 162 of actuator flex circuit 160 is coupled to bracket 164 by a single hex screw 167 provided through bore 167a in actuator flex circuit 160 and into threaded bore 167b in bracket 164; hex screw 167 secures bracket 164 to base 42. Flex circuit 160 includes an anterior portion 163 which wraps around arm body 110 (as shown in FIG. 9) and is attached to actuator arm body 110 by two flat head screws 180, 182 provided through bore 180a,182a in flex circuit 160. Tab 181 on flex circuit 160 includes two leads which are coupled to coil 86 to provide current for driving coil 86 in the voice coil motor. Flathead screw 180 is placed through bore 180a in circuit 160 and secured to arm body 110. Anterior end 161 of flex circuit 160 includes four leads which couple electrical signals to heads 60,61. Anterior end 163 includes a second bore 161a, and wraps around arm body 110 over arms 111 and 112, and is secured to actuator arm body 110 by placing screw 182 through bore 182a.

As shown in FIG. 9A, flex circuit 160 includes a region 168 for providing a controller chip 190 (FIG. 1) and coupling the controller chip to flex circuit 160. The controller chip at this interface acts in concert with the control electronics 34 on PCB 58 to provide control signals to the internal components of the drive. Pins 166 engage a corresponding geometrical arrangement of electrical leads on posterior portion 162 of flex circuit 160 indicated at region 162a in FIG. 9A.

Header 165 includes 16 connector pins 166. Twelve of pins 166 are dedicated to providing control signals to an actuator 52, while four of the pins (three in practical embodiments) are dedicated for use by the spin motor controller of the control electronics. A separate spin motor flex circuit (not shown) couples the pins dedicated to control the spin motor to spindle motor 50.

Electrical signals from control electronics 34 to spin motor 50 are coupled by lead wires 84 disposed in trench 85 in base 42 to provide current for driving spin motor 50.

Control Electronics

The preferred embodiment of the present invention utilizes an embedded microcontroller control system to manage and direct all essential functions of the mechanical aspects of the disk drive system. Data is stored in a data track band on each surface of a disk 48 defined by an outer (DOD) and inner (DID) track diameter. Actuator assembly 52, including a one head 60, 61 per data surface, is utilized to transfer data with respect to concentric data tracks. The primary control aspects of the electronics 34 include controlling the spin rate of the spindle motor 50 and the control of the actuator assembly 52 in positioning of the heads 60, 61 for the transfer of data with respect to selected data tracks.

Tables 1 and 2 below specify certain characteristics of disk 48.

TABLE 1

| | | |
|---|---|---|
| Number of Disks | 1 | |
| Number of Data Surfaces | 2 | |
| Number Data Cylinders (Tracks per surface) | 1327 | cylinders |
| User Sectors per Track | 93 | sectors |
| Sectors per Track | 94 | sectors |
| Bytes per Sector | 628 | bytes |
| Data Bytes per Sector | 512 | bytes |
| Data Capacity per Data Surface (formatted) | 63.2 | Mbytes |
| Total Data Capacity (formatted) | 126.4 | Mbytes |
| Total Data Capacity (unformatted) | 155 | Mbytes |

TABLE 2

| | | |
|---|---|---|
| Disk Data Outside Diameter | 61.97 | millimeters |
| Disk Data Inside Diameter | 39.12 | millimeters |
| Data Track Bank Width | 22.85 | millimeters |
| Track Density | 2905 | tracks/inch |
| Bit Density (max) | 33,200 | fci |
| Head Gap Width | 7 | microns |
| Track Width | 10.8 | microns |

The characteristics shown in Tables 1 and 2 are based on the utilization of thin film heads 60, 61. Standard metal-in-gap (MIG) heads may also be utilized as well as magneto-resistive heads. In the disk drive of the present invention, each head reads bits at a rate of 10–20 MHz. Thus, the maximum data transfer rate is approximately 3.75–7.5 Mbytes/sec.

The various objects and advantages of the present invention will be apparent to those skilled in the art. Numerous modifications to the drive of the present invention will be obvious to those skilled in the art. For example, while the information storage device of the present invention has been described herein with respect to a magnetic storage disk drive, it should be understood that the principles of the invention apply equally to other types of information storage devices, such as optical drives. In addition, while the magnetic storage device has been generally described with respect to the use of inductive heads, use of other head technologies, such as magneto-resistive heads, is well within contemplation of the scope of the invention. Such modifications are intended to be within the scope of the invention as disclosed in the instant specification and the following claims.

We claim:

1. A storage device, comprising:

a housing defining a controlled environment isolated from ambient atmospheric conditions;

a disk storage medium, mounted in the housing, having a surface including a data region and a non-data region;

a liquid lubricant disposed on the surface of the disk storage medium and within the housing;

a spindle motor for rotating the disk storage medium;

at least one read/write head;

actuator means for positioning the read/write head with respect to the disk storage medium;

a wick structure including a deposition wick comprising a first porous material, positioned overlying at least a portion of the data region adjacent to the surface of the disk storage medium, and a collection wick comprising a second porous material coupled to the first porous material each porous material having a porosity sufficient to carry the liquid lubricant through capillary action such that liquid in the housing is transferred from the collection wick to the deposition wick;

control means, coupled to the actuator means, read write head, and spindle motor, for interacting with the actuator means, head, and motor to read data from and write data to the disk storage medium; and wherein the housing has a length of about four inches, a height of about five-tenths inch, and a width of about two and three-quarters inches.

2. The storage device of claim 1 wherein the read/write head achieves a flying height of approximately one microinch or less when supported by the actuator means over the disk storage medium when the spindle motor rotates the disk storage medium.

3. The storage device of claim 1 wherein the wherein the liquid lubricant is a non-Newtonian fluid.

4. The storage device of claim 1 wherein the liquid lubricant is a Newtonian fluid.

5. The storage device of claim 3 wherein the spindle motor includes a hub supporting the disk storage medium, and a rotational support structure between the hub and the housing of the disk drive, and wherein the liquid lubricant is used as lubricant for the rotational support structure.

6. The storage device of claim 1 wherein the spindle motor comprises a bearing housing supported in the housing of the storage device;

a shaft having a first end and a second end, with the first end supported in the bearing housing by a journal bearing;

a hub coupled to the second end of the shaft; and a porous wicking material in contact with liquid lubricant in the storage device to circulate bearing fluid to the journal bearing.

7. The storage device of claim 3 wherein the actuator means includes an actuator arm supporting the head, and a bearing housing having two ball bearings supporting the actuator arm, and wherein the liquid lubricant is used as lubricant for the ball bearings.

8. The storage device of claim 1 wherein the actuator means includes an actuator arm having the head mounted at one end, the arm being coupled to a cross hair spring for rotation about a pivot point to position said at least one head with respect to the disk storage medium.

9. The storage device of claim 1 wherein the collection wick is disposed about the controlled environment, the collection wick comprises a semi-rigid porous material disposed adjacent to the disk storage medium and the actuator means.

10. A magnetic storage device, comprising:

a housing comprising a base and a cover, the base and cover each having an interior and exterior;

at least one magnetic storage disk having a first and second sides, each side having a data region and a non-data region;

a liquid bearing contained within the housing;

first and second recording heads;

an actuator supporting and positioning the recording heads with respect to the disk over a path encompassing the data region and a portion to the non-data region such that each head is positioned within a respective circumferential area of the first and second sides of the disk;

a spin motor supporting and rotating the magnetic storage disk;

a wick, having a first and second disposing portions comprised of a first porous material, the first and second disposing portions being positioned adjacent to the respective first and second sides of the disk at a position over the circumferential area, and a collection portion, comprised of a second porous material coupled to the disposing portions, the collection portion oriented about the interior of the base such that at least a portion of the liquid lubricant is in contact with the collection portion irrespective of the drive housing orientation with respect to gravity, wherein the first material and second material each have a porosity sufficient to carry the liquid lubricant by capillary action; and control means for inneracting with the actuator, the recording heads, and the spin motor to read data from and write data to the magnetic storage means.

11. The storage device of claim 10 wherein the collection, portion of the wick comprises a semi-rigid porous material.

12. The storage device of claim 11 wherein the collection portion is porous plastic.

13. The storage device of claim 11 wherein the collection portion is porous stainless steel.

14. The storage device of claim 10 wherein the wherein the liquid lubricant is a non-Newtonian fluid.

15. The storage device of claim 10 wherein the liquid lubricant is a Newtonian fluid.

16. The storage device of claim 10 wherein said spin motor includes a liquid journal bearing, the motor including means for recirculating bearing fluid in the motor to provide lubrication for rotation of the spin motor over the drive lifetime.

17. A storage device, comprising:

a sealed housing;

a spin motor positioned within the sealed housing;

a magnetic storage disk having a first and second surface mounted on the spin motor;

first and second read/write heads, each head being associated with one respective surface of the magnetic storage disk;

a liquid lubricant provided in the sealed housing;

an actuator assembly supporting and positioning the heads with respect to the disk;

a two part wick structure, comprising a transport wick assembly, comprised of a porous semi-solid material disposed about the interior of the housing, the semi-solid material having a porosity sufficient to support transport of the lubricant by capillary action and an applicator wick assembly, coupled to the transport wick assembly, comprised of a first and second portions of a porous fibrous material, the fibrous material having a porosity sufficient to support transport of the lubricant by capillary action, each portion positioned adjacent each respective surface of the disk; and control means, coupled to the spin motor, the actuator assembly and the read/write heads, for controlling the heads, actuator assembly and motor to position the heads, and read and write data to and from the disk.

* * * * *

UNITED STATES PATENT AND TRADEMARK OFFICE
CERTIFICATE OF CORRECTION

PATENT NO. : 5,559,650

DATED : September 24, 1996

INVENTOR(S) : Repphun, et al.

It is certified that error appears in the above-identified patent and that said Letters Patent is hereby corrected as shown below:

On the Title page, please add after item [76], item --[73]

Assignee: Seagate Technology, Inc.,
               Scotts Valley, California--.

Signed and Sealed this

Tenth Day of August, 1999

Attest:

Q. TODD DICKINSON

*Attesting Officer*     *Acting Commissioner of Patents and Trademarks*